US009866952B2

(12) United States Patent
Pandey et al.

(10) Patent No.: US 9,866,952 B2
(45) Date of Patent: *Jan. 9, 2018

(54) CONFERENCING APPARATUS THAT COMBINES A BEAMFORMING MICROPHONE ARRAY WITH AN ACOUSTIC ECHO CANCELLER

(71) Applicant: ClearOne, Inc., Salt Lake City, UT (US)

(72) Inventors: Ashutosh Pandey, Murray, UT (US); Darrin T. Thurston, Liberty, UT (US); David K. Lambert, South Jordan, UT (US); Tracy A. Bathurst, South Jordan, UT (US)

(73) Assignee: ClearOne, Inc., Salt Lake City, UT (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/217,904

(22) Filed: Jul. 22, 2016

(65) Prior Publication Data

US 2017/0134849 A1 May 11, 2017

Related U.S. Application Data

(63) Continuation of application No. 15/040,135, filed on Feb. 10, 2016, which is a continuation of application
(Continued)

(51) Int. Cl.
*H04R 3/00* (2006.01)
*H04R 1/40* (2006.01)
(Continued)

(52) U.S. Cl.
CPC .......... *H04R 1/406* (2013.01); *G10L 21/0232* (2013.01); *H04M 3/568* (2013.01);
(Continued)

(58) Field of Classification Search
CPC ...... G10L 2021/02082; G10L 21/0232; H04R 3/005; H04R 1/406; H04M 9/082; H04M 3/568
(Continued)

(56) References Cited

U.S. PATENT DOCUMENTS 5,550,924 A 8/1996 Helf et al.
5,787,183 A 7/1998 Chu et al.
(Continued)

OTHER PUBLICATIONS

Buck, et al., "Self-Calibrating Microphone Arrays for Speech Signal Acquisition: A Systematic Approach", Signal Processing; vol. 86, 2006, pp. 1230-1238.
(Continued)

*Primary Examiner* — Vivian Chin
*Assistant Examiner* — Ammar Hamid
(74) *Attorney, Agent, or Firm* — Matthew J. Booth PLLC; Matthew J. Booth

(57) ABSTRACT

The present disclosure discloses a conferencing apparatus for a conference between a local end and a far end that combines a beamforming microphone array with an acoustic echo canceller. The apparatus includes a beamforming microphone array that further comprises a plurality of microphones wherein each microphone is configured to sense acoustic waves and the plurality of microphones are oriented to develop a corresponding plurality of microphone signals. The apparatus further includes a processor, memory, and storage where the processor is configured to execute program instructions. The processor performs a beamforming operation to create a plurality of combined signals. In addition, the processor performs an acoustic echo cancellation operation to generate a plurality of combined echo cancelled signals. Further, the processor performs a direction of arrival determination; and, selects, in response to the
(Continued)

direction of arrival determination, one of the combined echo cancelled signals for transmission to the far end.

24 Claims, 15 Drawing Sheets

Related U.S. Application Data

No. 13/493,921, filed on Jun. 11, 2012, now Pat. No. 9,264,553.

(60) Provisional application No. 61/495,971, filed on Jun. 11, 2011, provisional application No. 61/495,968, filed on Jun. 11, 2011, provisional application No. 61/495,961, filed on Jun. 11, 2011.

(51) Int. Cl.
| | |
|---|---|
| H04M 3/56 | (2006.01) |
| H04M 9/08 | (2006.01) |
| G10L 21/0232 | (2013.01) |
| H04B 3/20 | (2006.01) |
| G10L 21/0208 | (2013.01) |
| G10L 21/0216 | (2013.01) |

(52) U.S. Cl.
CPC ............ *H04M 9/082* (2013.01); *H04R 3/005* (2013.01); *G10L 2021/02082* (2013.01); *G10L 2021/02166* (2013.01); *H04R 2201/403* (2013.01)

(58) Field of Classification Search
USPC .................................................... 381/92, 66
See application file for complete search history.

(56) References Cited

U.S. PATENT DOCUMENTS

| | | | |
|---|---|---|---|
| 6,449,593 | B1 | 9/2002 | Valve |
| 7,359,504 | B1 | 4/2008 | Reuss et al. |
| 7,724,891 | B2 | 5/2010 | Beaucoup et al. |
| 7,831,036 | B2 | 11/2010 | Beaucoup et al. |
| 7,970,123 | B2 | 6/2011 | Beaucoup |
| 8,019,091 | B2 | 9/2011 | Burnett et al. |
| 8,184,801 | B1 | 5/2012 | Hamalainen |
| 8,204,198 | B2 | 6/2012 | Adeney |
| 8,395,653 | B2 | 3/2013 | Feng et al. |
| 8,654,990 | B2 | 2/2014 | Faller |
| 8,660,274 | B2 | 2/2014 | Wolff et al. |
| 8,842,851 | B2 | 9/2014 | Beaucoup |
| 9,226,088 | B2 | 12/2015 | Pandey et al. |
| 9,264,553 | B2 | 2/2016 | Pandey et al. |
| 9,635,186 | B2 | 4/2017 | Pandey et al. |
| 9,641,688 | B2 | 5/2017 | Pandey et al. |
| 2004/0013038 | A1* | 1/2004 | Kajala .................... G01S 3/043 367/119 |
| 2006/0233353 | A1 | 10/2006 | Beaucoup et al. |
| 2007/0093714 | A1* | 4/2007 | Beaucoup ............ H04M 9/085 600/437 |
| 2008/0232607 | A1* | 9/2008 | Tashev ..................... G01S 3/86 381/71.11 |
| 2009/0052684 | A1 | 2/2009 | Ishibashi |
| 2009/0087000 | A1 | 4/2009 | Ko |
| 2010/0128892 | A1 | 5/2010 | Chen et al. |
| 2010/0131749 | A1 | 5/2010 | Kim et al. |
| 2010/0189275 | A1* | 7/2010 | Christoph .............. H04R 3/005 381/66 |
| 2010/0215184 | A1 | 8/2010 | Buck et al. |
| 2012/0128175 | A1 | 5/2012 | Visser et al. |
| 2012/0182429 | A1 | 7/2012 | Forutanpour et al. |
| 2012/0288079 | A1 | 11/2012 | Burnett et al. |
| 2013/0034241 | A1 | 2/2013 | Pandey et al. |
| 2013/0039504 | A1 | 2/2013 | Pandey et al. |
| 2016/0142548 | A1 | 5/2016 | Pandey et al. |
| 2016/0300584 | A1 | 10/2016 | Pandey et al. |
| 2016/0302006 | A1 | 10/2016 | Pandey et al. |
| 2016/0337523 | A1 | 11/2016 | Pandey et al. |

OTHER PUBLICATIONS

Chen, et al., "Design of Robust Broadband Beamformers With Passband Shaping Characteristics Using Tikhonov Regularization", IEEE Transactions on Audio, Speech, and Language Processing; vol. 17, No. 4, May 2009, pp. 665-681.

Compernolle, International Conference on Acoustics, Speech, and Signal Processing; ICASSP Apr. 3-Apr. 6; Katholieke Univ. Leuven, ESAT, Heverlee, Belgium; vol. 2, 1990, pp. 833-836.

Cook, et al., "An Alternative Approach to Interpolated Array Processing for Uniform Circular Arrays", APCCAS Asia-Pacific Conference on Circuits and Systems; vol. 1, Feb. 2002, pp. 411-414.

DiBiase, et al., "Robust Localization in Reverberant Rooms", Microphone Arrays: Techniques and Applications; Springer-Verlag; M. Brandstein and D. Ward, editors, 2001, pp. 157-180.

Do, et al., "A Real-Time SRP-PHAT Source Location Implementation Using Stochastic Region Contraction (SRC) on a Large-Aperture Microphone Array", IEEE International Conference on Acoustics, Speech and Signal Processing—ICASSP; vol. 1, No. 7, Apr. 2007, pp. 121-124.

Frost, III, "An Algorithm for Linearly Constrained Adaptive Array Processing", Proceedings of the IEEE; vol. 60, No. 8, Aug. 1972, pp. 926-935.

Gannot, et al., "Signal Enhancement Using Beamfor4ming and Nonstationarity with Applications to Speech", IEEE Transactions on Signal Processing; vol. 49, No. 8, Aug. 2001, pp. 1614-1626.

Herbordt, et al., "Joint Optimization of LCMV Beamforming and Acoustic Echo Cancellation", Proceedings ICASSP, Mar. 18-23; IEEE International Conference on Acoustics, Speech, and Signal Processing; vol. 3, 2005, pp. iii/77-iii/80.

Johansson, et al., "Robust Acoustic Direction of Arrival Estimation Using ROOT-SRP-PHAT, a Realtime Implementation", IEEE International Conference on Acoustics, Speech, and Signal Processing; (ICASSP Mar. 18-23); vol. 4, 2005, pp. IV/933-IV/936.

Johansson, et al., "Speaker Localisation Using the Far-Field SRP-PHAT in Conference Telephony", International Symposium on Intelligent Signal Processing and Communication Systems; Kaohsiung, Taiwan ROC, 2002, 5 pages.

Kammeyer, et al., "New Aspects of Combining Echo Cancellers with Beamformers", Proceedings, ICASSP Mar. 18-23, IEEE International Conference on Acoustics, Speech, and Signal Processing, vol. 3, 2005, pp. iii/137-iii/140.

Kellermann, "Acoustic Echo Cancellation for Beamforming Microphone Arrays", Microphone Arrays, Berlin, Heidelberg: Springer Berlin Heidelberg http://doi.org/10.1007/978-3-662-04619-7_13>, 2001, pp. 281-306.

Kellermann, "Strategies for Combining Acoustic Echo Cancellation and Adaptive Beamforming Microphone Arrays", Fachhochschule Regensburg, Germany; Proc. ICASSP, 1997, pp. 219-222.

Knapp, et al., "The Generalized Correlation Method for Estimation of Time Delay", IEEE Transactions on Acoustics, Speech, and Signal Processing; vol. ASSP-24, No. 4, Aug. 1976, pp. 320-327.

Lebret, et al., "Antenna Array Pattern Synthesis via Convex Optimization", IEEE Transactions on Signal Processing; vol. 45, No.3, Mar. 1997, pp. 526-532.

Lee, et al., "Multichannel Teleconferencing System with Multi Spatial Region Acoustic Echo Cancellation", International Workshop on Acoustic Echo and Noise Control (IWAENC); Koyoto Japan, Sep. 2003, 4 pages.

Liu, et al., "Adaptive Beamforming With Sidelobe Control: A Second-Order Cone Programming Approach", IEEE Signal Processing Letters; vol. 10, No. 11, Nov. 2003, pp. 331-334.

Lobo, et al., "Applications of Second-Order Cone Programming", Elsevier Science; Linear Algebra and its Applications, vol. 284, 1998, pp. 193-228.

(56) References Cited

OTHER PUBLICATIONS

Myllyla, et al., "Adaptive Beamforming Methods for Dynamically Steered Microphone Array Systems", IEEE International Conference on Acoustics, Speech and Signal Processing, Mar. 31-Apr. 4; ISBN 978-1-244-1483-3, 2008, pp. 305-308.
Pados, et al., "An Iterative Algorithm for the Computation of the MVDR Filter", IEEE Transactions on Signal Processing; vol. 49, No. 2, Feb. 2001, pp. 290-300.
Rabinkin, et al., "Estimation of wavefront arrival delay for acoustical signals using the cross-power spectrum phase technique", The Journal of the Accoustical Society of America; vol. 100, Issue No. 4, 1996, 10 pages.
Reuven, et al., "Joint Acoustic Echo Cancellation and Transfer Function GSCin the Frequency Domain", Department of Electrical Engineering, Technion—ITT, Haifa 32000, Israel; School of Engineering, Bar-Ilan University, Ramat-Gan, 52900, Israel; 23rd IEEE Convention of Electrical and Electronics Engineers in Israel; Proc. ICASSP, 2004, pp. 412-415.
Silverman, et al., "Performance of Real-Time Source-Location Estimators for a Large-Aperture Microphone Array", IEEE Transactions on Speech and Audio Processing; vol. 13, No. 4, Jul. 2005, pp. 593-606.
Yan, et al., "Convex Optimization Based Time-Domain Broadband Beamforming with Sidelobe Control (L)", Journal Acoustical Society of America; vol. 121, No. 1, Jan. 2007, pp. 46-49.
Brandstein, et al., "Microphone Arrays: Signal Processing Techniques and Applications", Digital Signal Processing, Springer-Verlag Berlin Heidelberg, 2001, pp. 1-401, pp. 1-401.
Gritton, et al., "Echo Cancellation Algorithms", IEEE ASSP Magazine, vol. 1, Issue 2, Apr. 1984, pp. 30-38., pp. 30-38.
IPR, "Declaration of Dr. Walter Kellermann, in Support of Petition for Inter Partes Review of U.S. Pat. No. 9,264,553", *Shure Incorporated v. ClearOne, Inc.*, IPR2017-01785 (PTAB), Jul. 14, 2017, 139 pages.
IPR, "Petition for Inter Partes Review of U.S. Pat. No. 9,264,553", *Shure Incorporated v. ClearOne, Inc.*, IPR2017-01785 (PTAB), Jul. 14, 2017, 81 pages.
Van Veen, et al., "Beamforming: A Versatile Approach to Spatial Filtering", IEEE ASSP Magazine, vol. 5, Issue 2, Apr. 1988, pp. 1-21, pp. 1-21.
Buchner, et al., "An Acoustic Human-Machine Interface with Multi-Channel Sound Reproduction", IEEE Fourth Vorkshop on Multimedia Signal Processing, 2001, pp. 359-364, 2001, pp. 359-364.
Buchner, et al., "Full-Duplex Communication Systems Using Loudspeaker Arrays and Microphone Arrays", IEEE International Conference on Multimedia and Expo, 2002, pp. 509-512., 2002, pp. 509-512.
Burton, et al., "A New Structure for Combining Echo Cancellation and Beamforming in Changing Acoustical Environments", IEEE International Conference on Acoustics, Speech and Signal Processing, 2007, pp. I-77—I-80., 2007, pp. I-77—I-80.
Campbell, "Adaptive Beamforming Using a Microphone Array for Hands-Free Telephony", Thesis submitted to the acuity of Virginia Polytechnic Institute and State University in partial fulfillment of the requirements for the degree of Vlaster of Science in Electrical Engineering, Feb. 16, 1999, 154 pages, Feb. 16, 1999, 154 pages.
Hamalainen, et al., "Acoustic Echo Cancellation for Dynamically Steered Microphone Array Systems", IEEE Norkshop on Applications of Signal Processing to Audio and Acoustics, Oct. 21-24, 2007, pp. 58-61., Oct. 21-24, 2007, pp. 58-61.
Herbordt, et al., "A Real-time Acoustic Human-Machine Front-End for Multimedia Applications Integrating Robust Adaptive Beamforming and Stereophonic Acoustic Echo Cancellation", 7th International Conference on Spoken Language Processing, Sep. 16-20, 2002, 4 pages, Sep. 16-20, 2002, 4 pages.
Herbordt, et al., "GSAEC—Acoustic Echo Cancellation embedded into the Generalized Sidelobe Canceller", 10th European Signal Processing Conference, 2000, 5 pages (with Abstract), 2000, 5 pages.
Huang, et al., "Immersive Audio Schemes [The Evolution of Multiparty Teleconferencing]", IEEE Signal Processing Magazine, Jan. 2011, pp. 20-32., Jan. 2011, pp. 20-32.
Kellermann, "Integrating Acoustic Echo Cancellation with Adaptive Beamforming Microphone Arrays", Forum Acusticum, Berlin, Mar. 14-19, 1999, pp. 1-4., Mar. 14-19, 1999, pp. 1-4.
Kobayashi, et al., "A Hands-Free Unit with Noise Reduction by Using Adaptive Beamformer", IEEE Transactions on consumer Electronics, vol. 54, No. 1, Feb. 2008, pp. 116-122., Feb. 2008, pp. 116-122.
Marquardt, et al., "A Natural acoustic front-end for Interactive TV in the EU-Project Digit", IEEE Pacific Rim conference on Communications, Computers and Signal Processing, 2009, pp. 894-899., 2009, pp. 894-899.
Maruo, et al., "On the Optimal Solutions of Beamformer Assisted Acoustic Echo Cancellers", IEEE Statistical Signal Processing Workshop, 2011, pp. 641-644., 2011, pp. 641-644.
Mohammed, "A New Adaptive Beamformer for Optimal Acoustic Echo and Noise Cancellation with Less computational Load", Canadian Conference on Electrical and Computer Engineering, May 4-7, 2008, pp. 000123-000128, May 4-7, 2008, pp. 000123-000128.
Wang, et al., "Combining Superdirective Beamforming and Frequency-Domain Blind Source Separation for Highly Reverberant Signals", Eurasip Journal on Audio,Speech, and Music Processing, vol. 2010, Article ID: 797962, 2010, pp. 1-13., 2010, pp. 1-13.
Yensen, et al., "Synthetic Stereo Acoustic Echo Cancellation Structure with Microphone Array Beamforming for VIOP conferences", IEEE International Conference on Acoustics, Speech, and Signal Processing, Jun. 5-9, 2000, pp. 817-820., Jun. 5-9, 2000, pp. 817-820.
IPR, "Patent Owner's Preliminary Response", *Shure Incorporatedv. ClearOne, Inc.*, IPR2017-01785 (PTAB), Paper No. 8, Nov. 5, 2017, 58.

* cited by examiner

CONFERENCING APPARATUS THAT COMBINES A BEAMFORMING MICROPHONE ARRAY WITH AN ACOUSTIC ECHO CANCELLER

CROSS REFERENCE TO RELATED APPLICATIONS

This application claims priority and the benefits of the earlier filed Provisional U.S. No. 61/495,961, filed 11 Jun. 2011, which is incorporated by reference for all purposes into this specification.

This application claims priority and the benefits of the earlier filed Provisional U.S. No. 61/495,968, filed 11 Jun. 2011, which is incorporated by reference for all purposes into this specification.

This application claims priority and the benefits of the earlier filed Provisional U.S. No. 61/495,971, filed 11 Jun. 2011, which is incorporated by reference for all purposes into this specification.

Additionally, this application is a continuation of U.S. Ser. No. 13/493,921, filed 11 Jun. 2012, which is incorporated by reference for all purposes into this specification.

Additionally, this application is a continuation of U.S. Ser. No. 15/040,135, filed 10 Feb. 2016, which is incorporated by reference for all purposes into this specification.

1. TECHNICAL FIELD

This disclosure relates to a conferencing apparatus that uses a beamforming microphone. More specifically, this disclosure relates to a conferencing apparatus that combines a beamforming microphone array with an acoustic echo canceller for conferencing applications.

2. BACKGROUND ART

A beamforming microphone array (BMA) substantially improves the audio quality in a conferencing apparatus and application. Furthermore, a conferencing solution with a BMA needs to incorporate an acoustic echo canceller (AEC) for full duplex audio. Two strategies, "AEC first" and "beamformer first", have been proposed to combine an acoustic echo canceller with a beamforming microphone array. The "beamformer first" method performs beamforming on microphone signals and subsequently echo cancellation is applied on the beamformed signals.

The "beamformer first" method is known to be computationally friendly but requires continuous learning in the echo canceller due to changing characteristics of the beamformer in response to changing acoustic scenarios such as talkers and noise. Often this renders the "beamformer first" method impractical for good conferencing systems. On the other hand, the "echo canceller first" system applies echo cancellation on each microphone signal and subsequently beamforming is applied on the echo cancelled signals.

The "AEC first" system provides better echo cancellation performance but is computationally intensive as the echo cancellation is applied for every microphone in the microphone array. The computational complexity increases as the number of microphones in the microphone array increases. This computational complexity increase results in a corresponding cost increase that places a practical limit on the number of microphones that can be used in a microphone array, which, in turn, limits the maximum benefit that can be obtained from the beamforming algorithm.

The present disclosure implements a conferencing solution with a BMA and AEC in the "beamformer first" configuration with fixed beams followed by echo cancellers for each beam. This solution enables an increase in microphones for a better beamforming without the need for additional echo cancellers as the number of microphones increases. In addition, the present disclosure provides that the echo cancellers do not need to adapt all the time as a result of large changes in the beamformer because the number of beams and beam pickup patterns are fixed. Therefore, the present disclosure provides good echo cancellation performance without a huge increase in computational complexity for a large number of microphones.

SUMMARY OF INVENTION

The present disclosure describes a conferencing apparatus for a conference between a local end and a far end that combines a beamforming microphone array with an acoustic echo canceller. The apparatus includes a beamforming microphone array that further comprises a plurality of microphones wherein each microphone is configured to sense acoustic waves and the plurality of microphones are oriented to develop a corresponding plurality of microphone signals. The apparatus further includes a processor, memory, and storage operably coupled to the beamforming microphone array, where the processor is configured to execute program instructions. The processor performs a beamforming operation with a beamforming module to combine the plurality of microphone signals from the beamforming microphone array to a plurality of combined signals that is greater in number than one and less in number than the plurality of microphone signals, each of the plurality of combined signals corresponding to a different fixed beam. In addition, the processor performs an acoustic echo cancellation operation with an acoustic echo canceller on the plurality of combined signals to generate a plurality of combined echo cancelled signals. Further, the processor performs a direction of arrival determination with a direction of arrival module on the plurality of microphone signals. In addition, the processor select, in response to the direction of arrival determination, with a signal selection module one of the combined echo cancelled signals for transmission to the far end.

Further, the apparatus of the present disclosure provides that the processor is further configured to perform a partial acoustic echo cancellation operation with a partial acoustic echo canceller on a subset of microphone signals which is greater than one and less than the plurality of microphone signals wherein the partial acoustic echo cancellation operation is a computational efficient was to improve said direction of arrival determination by estimating the direction for the local end talker(s).

Additionally, the apparatus of the present disclosure provides that the processor is further configured to noise filter the plurality of combined echo cancelled signals.

Further, the apparatus of the present disclosure provides that the acoustic echo cancellation operation is performed on each said fixed beam with a separate said acoustic echo canceller.

Finally, the apparatus of the present disclosure provides that the processor is further configured to enhance the direction of arrival determination with a voice activity detector.

BRIEF DESCRIPTION OF DRAWINGS

To further aid in understanding the disclosure, the attached drawings help illustrate specific features of the disclosure and the following is a brief description of the attached drawings.

DISCLOSURE OF EMBODIMENTS

Figure 1A:
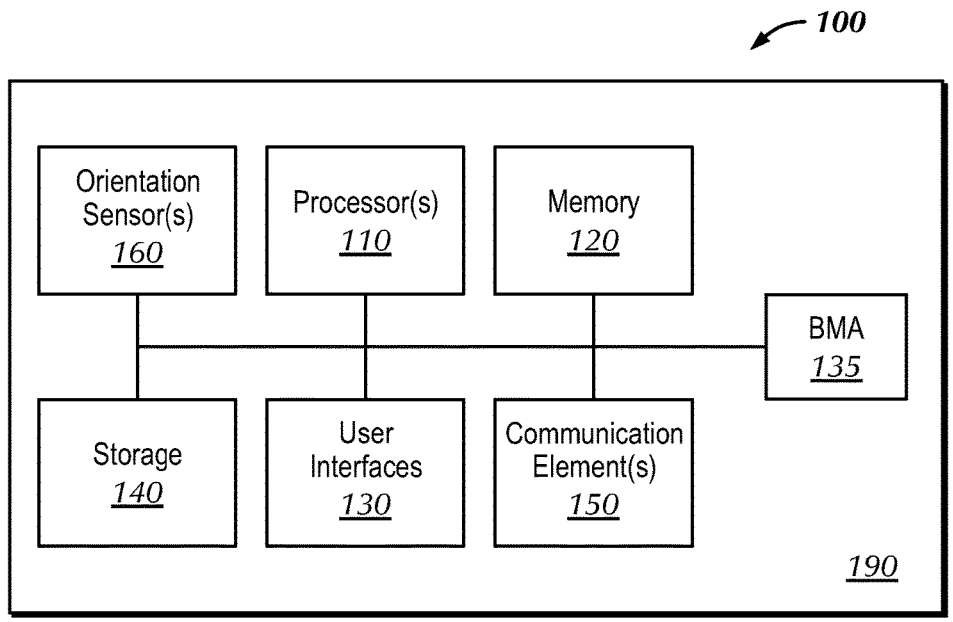
FIGS. 1A and 1B are a block diagrams illustrating a conferencing apparatus according to several embodiments of the present invention.

The disclosed embodiments are intended to describe aspects of the disclosure in sufficient detail to enable those skilled in the art to practice the invention. Other embodiments may be utilized and changes may be made without departing from the scope of the disclosure. The following detailed description is not to be taken in a limiting sense, and the scope of the present invention is defined only by the included claims.

Furthermore, specific implementations shown and described are only examples and should not be construed as the only way to implement or partition the present disclosure into functional elements unless specified otherwise herein. It will be readily apparent to one of ordinary skill in the art that the various embodiments of the present disclosure may be practiced by numerous other partitioning solutions.

In the following description, elements, circuits, and functions may be shown in block diagram form in order not to obscure the present disclosure in unnecessary detail. Additionally, block definitions and partitioning of logic between various blocks is exemplary of a specific implementation. It will be readily apparent to one of ordinary skill in the art that the present disclosure may be practiced by numerous other partitioning solutions. Those of ordinary skill in the art would understand that information and signals may be represented using any of a variety of different technologies and techniques. For example, data, instructions, commands, information, signals, bits, symbols, and chips that may be referenced throughout the description may be represented by voltages, currents, electromagnetic waves, magnetic fields or particles, optical fields or particles, or any combination thereof. Some drawings may illustrate signals as a single signal for clarity of presentation and description. It will be understood by a person of ordinary skill in the art that the signal may represent a bus of signals, wherein the bus may have a variety of bit widths and the present disclosure may be implemented on any number of data signals including a single data signal.

The various illustrative logical blocks, modules, and circuits described in connection with the embodiments disclosed herein may be implemented or performed with a general purpose processor, a special purpose processor, a Digital Signal Processor (DSP), an Application Specific Integrated Circuit (ASIC), a Field Programmable Gate Array (FPGA) or other programmable logic device, discrete gate or transistor logic, discrete hardware components, or any combination thereof designed to perform the functions described herein. A general purpose processor may be a microprocessor, any conventional processor, controller, microcontroller, or state machine. A general purpose processor may be considered a special purpose processor while the general purpose processor is configured to execute instructions (e.g., software code) stored on a computer readable medium. A processor may also be implemented as a combination of computing devices, such as a combination of a DSP and a microprocessor, a plurality of microprocessors, one or more microprocessors in conjunction with a DSP core, or any other such configuration.

In addition, the disclosed embodiments may be described in terms of a process that may be depicted as a flowchart, a flow diagram, a structure diagram, or a block diagram. Although a process may describe operational acts as a sequential process, many of these acts can be performed in another sequence, in parallel, or substantially concurrently. In addition, the order of the acts may be rearranged.

Figure 3:
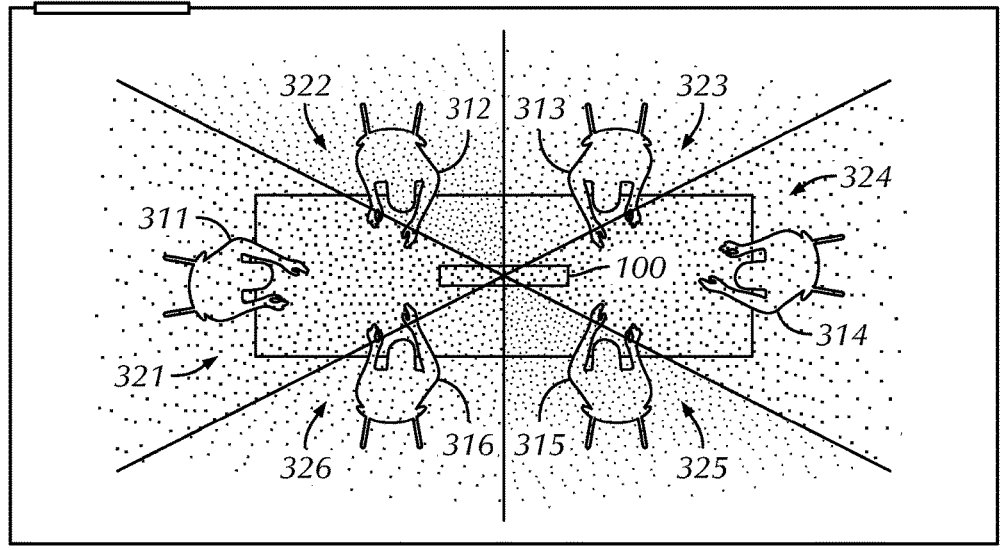
FIG. 3 illustrates a top view and a side view of a conference room including participants and a conferencing apparatus placed on a table and illustrating beams that may be formed by a beamforming microphone array integrated into the conferencing apparatus.
Figure 3:
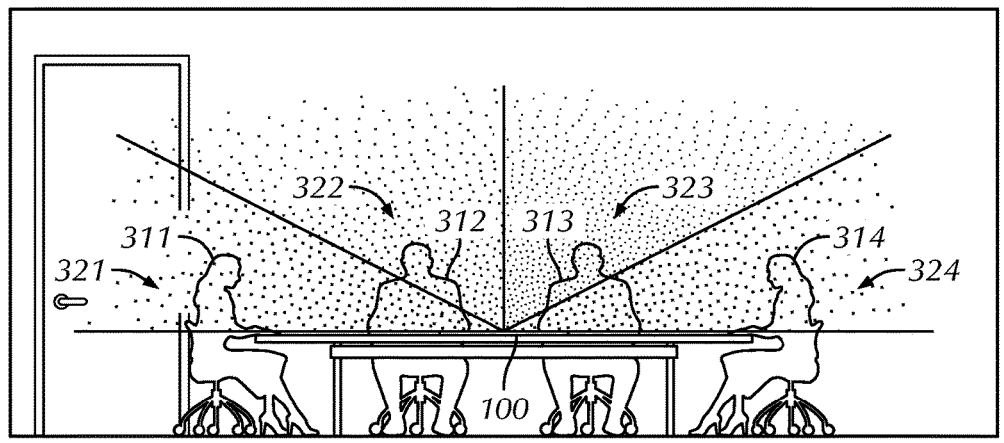

Elements described herein may include multiple instances of the same element. These elements may be generically indicated by a numerical designator (e.g. 110) and specifically indicated by the numerical indicator followed by an alphabetic designator (e.g., 110A) or a numeric indicator preceded by a "dash" (e.g., 110-1). For ease of following the description, for the most part element number indicators begin with the number of the drawing on which the elements are introduced or most fully discussed. For example, where feasible, elements in FIG. 3 are designated with a format of 3xx, where 3 indicates FIG. 3 and xx designates the unique element.

It should be understood that any reference to an element herein using a designation such as "first," "second," and so forth does not limit the quantity or order of those elements, unless such limitation is explicitly stated. Rather, these designations may be used herein as a convenient method of distinguishing between two or more elements or instances of an element. Thus, a reference to first and second element does not mean that only two elements may be employed or that the first element must precede the second element in some manner. In addition, unless stated otherwise, a set of elements may comprise one or more elements.

Embodiments of the present disclosure include a conferencing apparatus that combines a beamforming microphone array with an acoustic echo canceller. The present invention improves the acoustic quality of beamforming microphone arrays with echo cancellation by performing this echo cancellation efficiently. The conferencing apparatus described in the present disclosure is applicable to both teleconferencing and video conferencing environments as the present invention is focused on the audio aspects of the conferencing environment.

A good conferencing device requires good quality of the local talker audio and cancellation of the far end audio. The local talker is often picked up with directional microphones or beamforming microphone arrays for good audio quality. The beamforming microphone array uses multiple microphones to create a beam in the local talker's direction to improve audio quality. The audio quality improves with an increase in the number of microphones used in the beamforming microphone array although a point of diminishing returns will eventually be reached. In a conferencing situation, audio of the far end talker picked up by that the beamforming microphone array, commonly referred to as echo, needs to be cancelled before transmitting to the local end. This cancelling is achieved by an acoustic echo canceller (AEC) that uses the loudspeaker audio of the far end talker as a reference. When using a beamforming microphone array, there are multiple ways of doing acoustic echo cancellation and beamforming to produce the desired results.

FIG. 1A illustrates a conferencing apparatus 100 for one embodiment of the present disclosure. The conferencing apparatus 100 may include elements for executing software applications as part of embodiments of the present disclosure. Thus, the system 100 is configured for executing software programs containing computing instructions and includes one or more processors 110, memory 120, one or more communication elements 150, and user interface elements 130, and a beamforming microphone array (BMA), 135. The system 100 may also include storage 140. The conferencing apparatus 100 may be included in a housing 190. Other embodiments of the conferencing apparatus can include having the various components in one or more housings connected by communication elements as described below.

The processor 110 may be configured to execute a wide variety of applications including the computing instructions to carry out embodiments of the present disclosure.

The memory 120 may be used to hold computing instructions, data, and other information for performing a wide variety of tasks including performing embodiments of the present disclosure. By way of example, and not limitation, the memory 120 may include Static Random Access Memory (SRAM), Dynamic RAM (DRAM), Read-Only Memory (ROM), Flash memory, and the like.

Information related to the system 100 may be presented to, and received from, a user with one or more user interface elements 130. As non-limiting examples, the user interface elements 130 may include elements such as LED status indicators, displays, keyboards, mice, joysticks, haptic devices, microphones, speakers, cameras, and touchscreens.

The communication elements 150 may be configured for communicating with other devices and or communication networks. As non-limiting examples, the communication elements 150 may include elements for communicating on wired and wireless communication media, such as for example, serial ports, parallel ports, Ethernet connections, universal serial bus (USB) connections IEEE 1394 ("Firewire") connections, Bluetooth wireless connections, 802.1 a/b/g/n type wireless connections, and other suitable communication interfaces and protocols.

The storage 140 may be used for storing relatively large amounts of non-volatile information for use in the computing system 100 and may be configured as one or more storage devices. By way of example, and not limitation, these storage devices may include computer-readable media (CRM). This CRM may include, but is not limited to, magnetic and optical storage devices such as disk drives, magnetic tapes, CDs (compact disks), DVDs (digital versatile discs or digital video discs), semiconductor devices such as USB Drives, SD cards, ROM, EPROM, Flash Memory, other types of memory sticks, and other equivalent storage devices.

Software processes illustrated herein are intended to illustrate representative processes that may be performed by the systems illustrated herein. Unless specified otherwise, the order in which the process steps are described is not intended to be construed as a limitation, and steps described as occurring sequentially may occur in a different sequence, or in one or more parallel process streams. It will be appreciated by those of ordinary skill in the art that many steps and processes may occur in addition to those outlined in flow charts. Furthermore, the processes may be implemented in any suitable hardware, software, firmware, or combinations thereof. When executed as firmware or software, the instructions for performing the processes may be stored on a computer-readable medium.

By way of non-limiting example, computing instructions for performing the processes may be stored on the storage 140, transferred to the memory 120 for execution, and executed by the processors 110. The processor 110, when executing computing instructions configured for performing the processes, constitutes structure for performing the processes and can be considered a special-purpose computer when so configured. In addition, some or all portions of the processes may be performed by hardware specifically configured for carrying out the processes.

In some embodiments, an orientation sensor 160 may be included. As a non-limiting example, accelerometers configured to sense acceleration in at least two substantially orthogonal directions may be used. As another non-limiting example, a multi-axis accelerometer may be used. Of course, other types of position sensors may also be used, such as for example magnetometers to sense magnetic fields of the Earth.

Single- and multi-axis models of accelerometers may be used to detect magnitude and direction of the proper acceleration (i.e., g-force), and can be used to sense orientation. Orientation can be sensed because the accelerometers can detect gravity acting in different directions relative to the microphone array housing. The proper acceleration measured by an accelerometer is the acceleration associated with the phenomenon of weight experienced by any mass at rest in the frame of reference of the accelerometer device. For example, an accelerometer can measure a value of "g" in the upward direction when remaining stationary on the ground, because masses on the Earth have weight (i.e., mass*g). Another way of stating this phenomenon is that by measuring weight, an accelerometer measures the acceleration of the free-fall reference frame (i.e., the inertial reference frame) relative to itself.

One particular type of user interface element 130 used in embodiments of the present disclosure is a beamforming microphone array (BMA) 135 that comprises a plurality of microphones.

Thus, accelerometers mounted in the housing 190 can be used to determine the orientation of the housing 190. If the BMA 135 is also mounted in the housing 190, the orientation of the BMA 135 is easily determined because it is in a fixed position relative to the housing 190.

Directional microphones are often used in a conference to capture participant's audio. In a conference, microphones are usually placed on a table or hung from the ceiling and are manually positioned so that a participant's audio is in the pick-up pattern of the microphone. Since, the pick-up patterns of these microphones are fixed, more often than not one type of microphone, say a tabletop microphone, may not work for another type of installation, say a ceiling installation. Thus, an installer may need to know the type of installation (e.g., tabletop or ceiling), the angle of participants relative to the microphones, and the number of participants before installing a correct set of microphones. One skilled in the art will appreciate that the disclosed invention is applicable to a variety of microphones including various directional microphones, omnidirectional microphones, and other types of microphones. One embodiment of the disclosed invention uses omnidirectional microphones.

Directional microphones may be used in conferencing applications to perform spatial filtering to improve audio quality. These microphones have a beam pattern that selectively picks up acoustic waves in a region of space and rejects others.

In some embodiments of the present disclosure, the conferencing apparatus 100 uses a BMA 135 that can be installed in a number of positions and configurations, and beams for the microphones can be adjusted with base level configurations or automatically bring participants into the pick-up pattern of the beamforming microphone array 135 based on the orientation and placement of the conferencing apparatus 100.

Figure 1B:
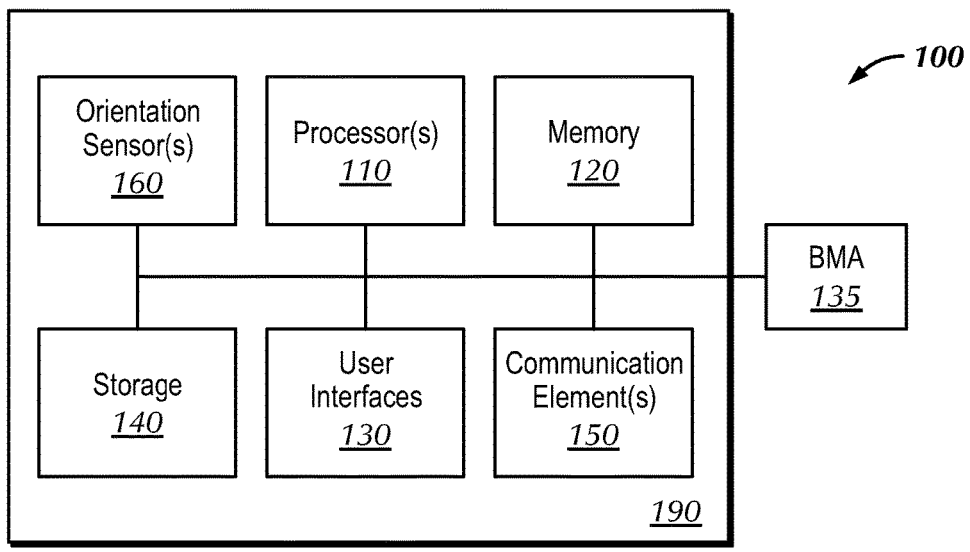

FIG. 1B illustrates another embodiment of the present invention that illustrates the BMA 135 being located outside of the housing 190. In this embodiment, the BMA 135 can be located further away from the main processing elements of the housing 190 and connect to those elements by way of the communication elements 150 that could include for example a USB connection. In this embodiment, the BMA 135 may further include its own processor, memory, and storage that is separate from the main conferencing apparatus in housing 190.

Figure 2:
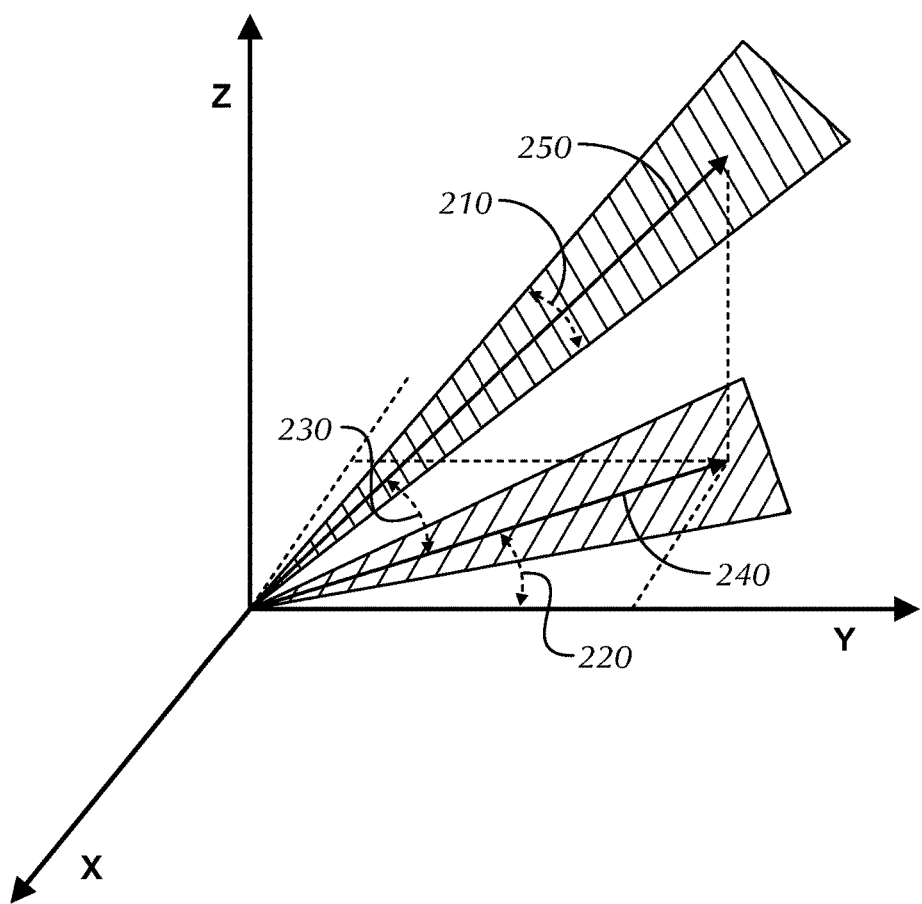
FIG. 2 illustrates geometrical representations of a beam for a microphone.

FIG. 2 illustrates geometrical representations of a beam for a microphone. The center of the beam direction 250 extends from the microphone with beam width 210. The beam pattern for a microphone is usually specified with the center of the beam direction 250 that includes an azimuth angle 220, an elevation angle 230, and beam width 210.

Beamforming is a signal processing technique carried out by the processor 110 using input from the beamforming microphone array 135. Various signal-processing characteristics of each of the microphones in the beamforming microphone array 135 may be modified. The signals from the various microphones may be combined such that signals at particular angles experience constructive interference while others experience destructive interference. Thus, beamforming can be used to achieve spatial selectivity such that certain regions can be emphasized (i.e., amplified/unsuppressed) and other regions can be de-emphasized (i.e., attenuated). As a non-limiting example, the beamforming processing may be configured to attenuate sounds that originate from the direction of a door to a room or from an Air Conditioning vent.

Beamforming may use interference patterns to change the directionality of the array. In other words, information from the different microphones may be combined in such a way that the expected pickup pattern is preferentially observed. As an example, beamforming techniques may involve combining delayed signals from each microphone at slightly different times so that every signal reaches the output at substantially the same time.

Moreover, signals from each microphone may be amplified by a different amount. Different weighting patterns may be used to achieve the desired polar patterns. As a non-limiting example, a main lobe may be produced together with nulls and sidelobes. As well as controlling the main lobe width (the beam) and the sidelobe levels, the position of a null can be controlled. This is useful to ignore noise in one particular direction, while listening for events in other directions. Adaptive beamforming algorithms may be included to automatically adapt to different situations.

Embodiments of the present disclosure include a beamforming microphone array, where the elevation and azimuth angles of the beams can be programmed with software settings or automatically adapted for an application. In some embodiments, various configurations for the conferencing apparatus, such as tabletop, ceiling, and wall configurations can be automatically identified with the orientation sensor 160 in the conferencing apparatus 100.

In order to balance computational complexity of the complete system and the number of microphones used to perform beamforming, the present invention discloses a new architecture in which echo cancellation is performed on the fixed beams. A fixed beam is defined as a beam that is defined with pre-computed parameters rather than being adaptively pointed to look in different directions on-the-fly. The pre-computed parameters are configured prior to use of the beamforming microphone array in a conference. The spatial direction in which a beam does not attenuate sound, or alternatively, the spatial direction in which the beam has maximun gain, is called the look-direction of that beam.

FIG. 3 illustrates a top view and a side view of a conference room including participants and a conferencing apparatus 100 in a table configuration and illustrating beams that may be formed by the BMA. Beams 321, 322, 323, 324, 325, and 326 can be configured with direction, beamwidth, amplification levels, and spatial selectivity to obtain complete and high quality coverage of participants, 311, 312, 313, 314, 315, and 316, respectively.

While creating beams, two things must be kept in mind. First, the narrower the beam, the better may be the sound quality (i.e. noise and reverberation rejection) of the local audio due to beamforming. Second, the combined look-directions of all of the beams should cover the desired space where a participant may be present. A situation with six beams around a microphone array is shown in FIG. 3 in which at least one of the beams will pick up any talker sitting around the table. While a narrow beam may improve the sound quality, a very narrow beam may create other problems, specifically, voids in coverage or distortion of speech picked up slightly off of the main direction of look of the beam. In practice, having 3 to 8 beams to cover all participants around a microphone array is considered a good solution. A considerably higher number of microphones than (3 to 8) is required before the full potential of the directional filtering in a conference situation due to beamforming can be achieved. In some embodiments of the present disclosure, it has been found that 20 to 30 microphones can provide good performance.

Figure 4:
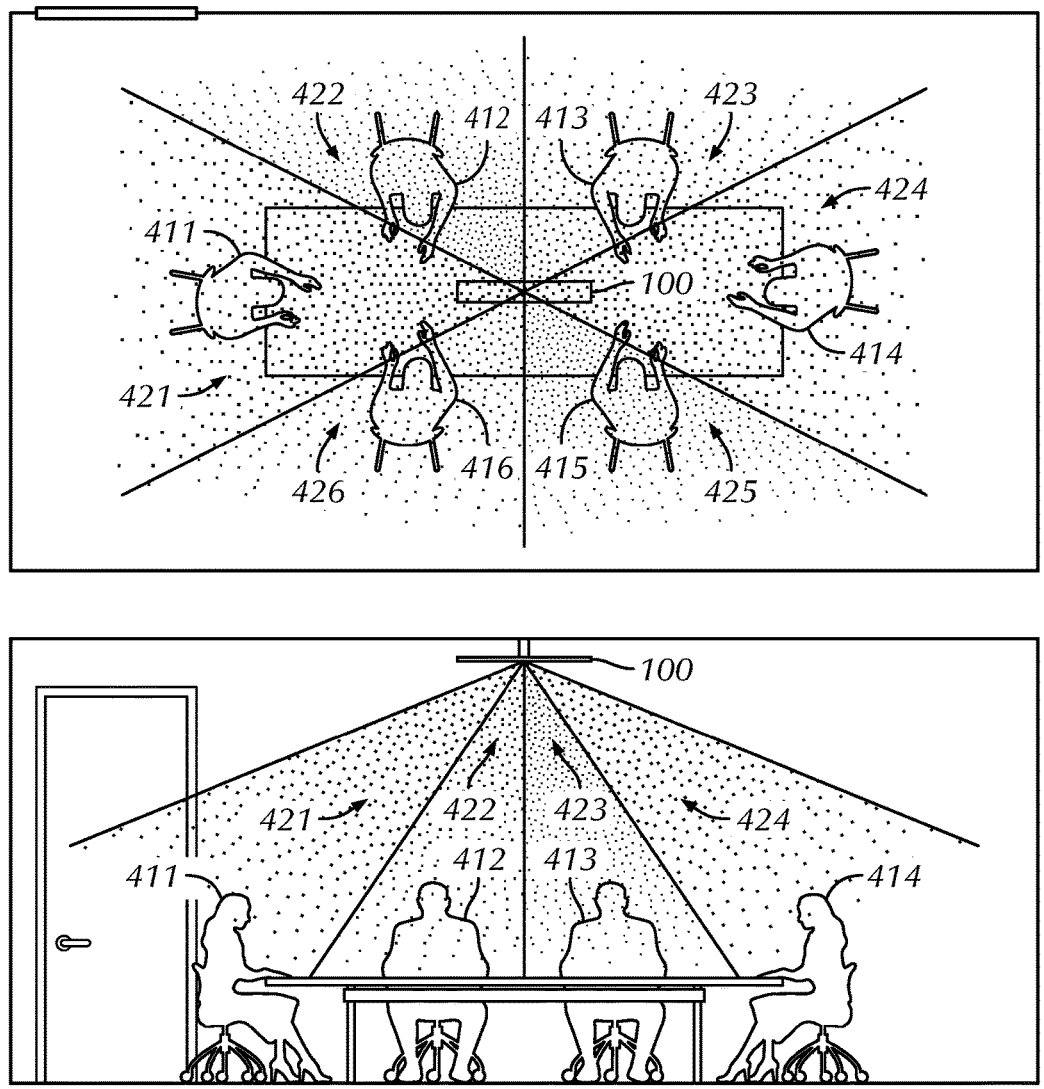
FIG. 4 illustrates a top view and a side view of a conference room including participants and a conferencing apparatus mounted on a ceiling and illustrating beams that may be formed by a beamforming microphone array integrated into the conferencing apparatus.

FIG. 4 illustrates a top view and a side view of a conference room including participants and a conferencing apparatus 100 in a ceiling configuration and illustrating beams that may be formed by a BMA 135. Beams 421, 422, 423, 424, 425, and 426 can be configured with direction, beamwidth, amplification levels, and interference patterns to obtain quality coverage of participants, 411, 412, 413, 414, 415, and 416, respectively.

Figure 5:
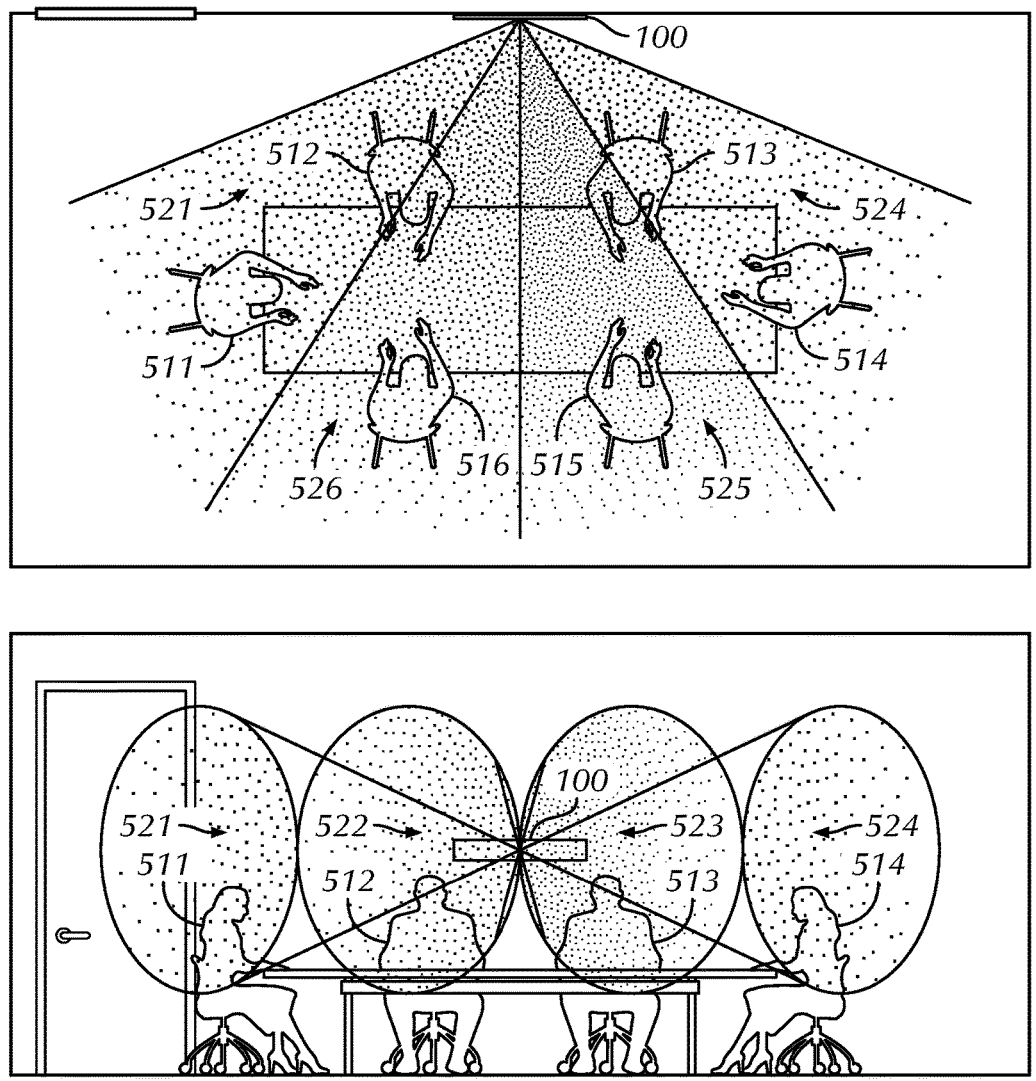
FIG. 5 illustrates a top view and a side view of a conference room including participants and a conferencing apparatus mounted on a wall and illustrating beams that may be formed by a beamforming microphone array integrated into the conferencing apparatus.

FIG. 5 illustrates a top view and a side view of a conference room including participants and a conferencing apparatus 100 in a wall configuration and illustrating beams that may be formed by the BMA 135. Beams 521, 522, 523, 524, 525, and 526 can be configured with direction, beamwidth, amplification levels, and interference patterns to obtain quality coverage of participants, 511, 512, 513, 514, 515, and 516, respectively.

In FIGS. 3-5, the azimuth/elevation angles and beamwidths may be fixed to cover desired regions. As a non-limiting example, the six beams illustrated in FIG. 3 and FIG. 4 can each be configured with beamwidths of 60 degrees with the BMA 135. The elevation angle of each beam is designed to cover most people sitting at a table. As a non-limiting example, an elevation angle of 30 degrees may cover most tabletop applications. On the other hand, for a ceiling application, the elevation angle is usually higher as shown in FIG. 4. As a non-limiting example, an elevation angle closer to 60 degrees may be appropriate for a ceiling application. Finally, for a wall application, as shown in FIG. 5, the elevation angle may be appropriate at or near zero degrees.

While these default elevation angles may be defined for each of the orientations, the user, installer, or both, have flexibility to change the elevation angle with software settings at the time of installation or before a conference.

Figure 6:
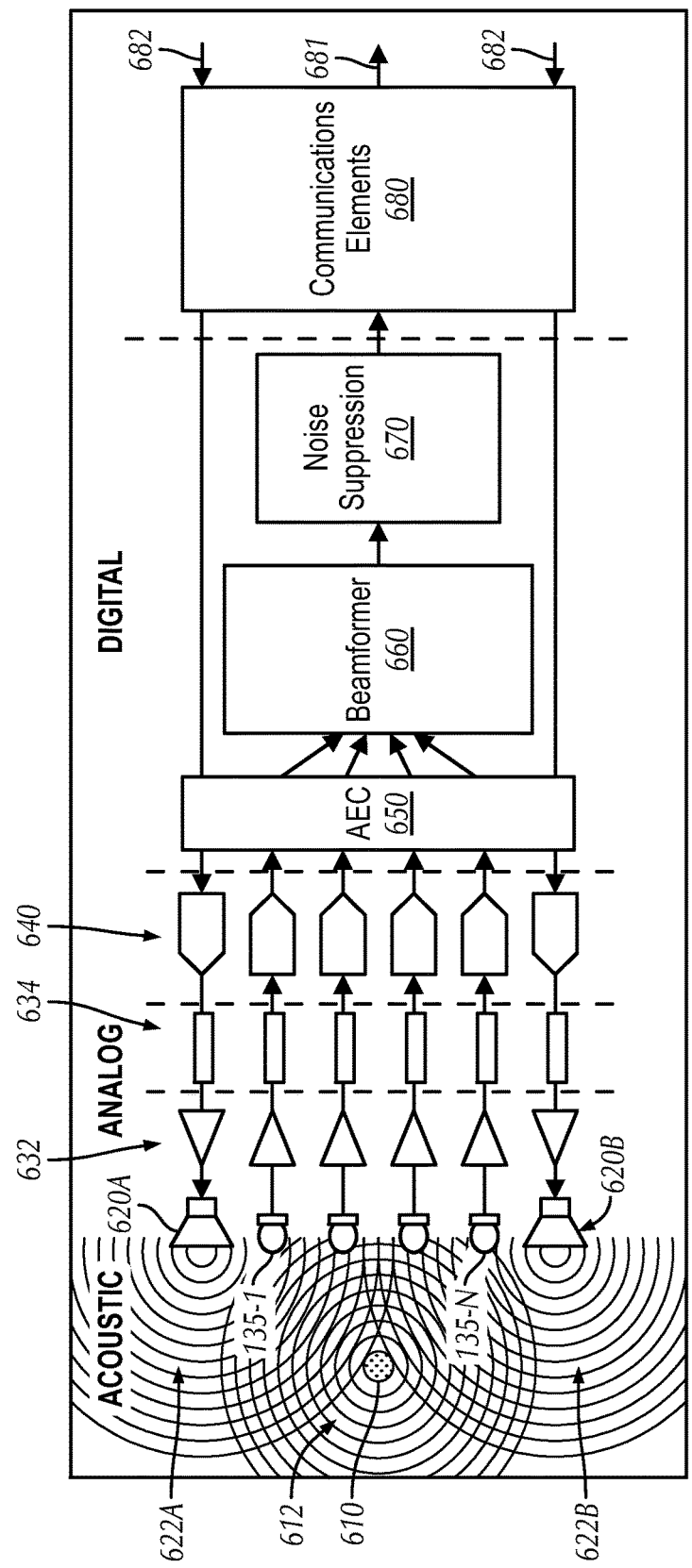
FIG. 6 illustrates elements involved in sensing acoustic waves with a plurality of microphones and signal processing that may be performed on the sensed acoustic waves.

FIG. 6 illustrates elements involved in sensing acoustic waves with a plurality of microphones and signal processing that may be performed on the sensed acoustic waves. The plurality of microphones 135-1 through 135-N can be configured into a BMA 135. In an acoustic environment on the left of FIG. 6, an acoustic source 610 (e.g., a participant) may generate acoustic waves 612. In addition, speakers 620A and 620B may generate acoustic waves 622A and 622B respectively. A BMA 135 senses the acoustic waves (612, 622A, and 622B). Amplifiers 632 may filter and modify the analog signals to the speakers 620A and 620B and from BMA 135. Converters 640 in the form of analog-to-digital converters and digital-to-analog converters convert signals between the analog domain and the digital domain. Cables 634 route the signals between amplifiers 632 and converters 640. Various signal-processing algorithms may be performed on the digital signals, such as, for example, acoustic echo cancellation using an acoustic echo canceller or AEC 650, beamforming 660, and noise suppression 670. The resulting signals are transmitted and received through communications element 680 that receives the far end audio signal 682 and transmits the local audio signal 681. Various communication techniques can be used for the transmission of the audio signal, such as, for example, using a Voice over Internet Protocol (VOIP) application.

The following discussion concentrates on the signal processing operations and how beamforming and acoustic echo cancellation may be performed in various configurations. Two strategies, "echo canceller first" and "beamformer first," have been employed to combine an acoustic echo canceller (AEC) with a beamforming microphone array (BMA).

The "beamformer first" method performs beamforming on microphone signals and subsequently echo cancellation is applied on the beamformed signals. The "beamformer first" method is relatively computational friendly but requires continuous learning in the echo canceller due to changing characteristics of the beamformer. Often these changes render the "beamformer first" method impractical for good conferencing systems. The "beamformer first" configuration uses microphone signals to select a pre-calculated beam based on a direction of arrival (DOA) determination. Subsequently, the echo from the far end audio in the beamformer output signal is cancelled with an AEC.

On the other hand, an "echo canceller first" system applies echo cancellation on each microphone signal and subsequently beamforming is applied on the echo cancelled signals based on the DOA determination. This system provides better echo cancellation performance but can be computationally intensive for a large BMA as the echo cancellation is applied for every microphone in the microphone array. The computational complexity increases with an increase in the number of microphones in the microphone array. This computational complexity often limits the number of microphones used in a microphone array and therefore prevents achievement of the substantial benefit from the beamforming algorithm with more microphones.

In terms of spatially filtering the audio, both configurations are equivalent. However, echo cancellation performance can be significantly different for one application to other. Specifically, as the beam is moving, the echo canceller needs to readjust. In a typical conferencing situation, talker directions keep switching and, therefore, the echo canceller needs to readjust which may result in residual echo in the audio sent to the far end. Some researchers have recommended combining beamformer and echo canceller adaptation to avoid this problem, however, in our experiments that did not get rid of residual echo. On the other hand, since echo is cancelled beforehand in the "AEC first" method, the echo canceller performance is not affected as beam switches. Often, the "AEC first" configuration is recommended for the beamformer/AEC system. One of the examples of such a system is Microsoft's AEC/beamformer implementation in the DirectX technology, which is shown in FIG. 6.

While the "AEC first" configuration provides acceptable performance for the beamformer/AEC implementation, the computational complexity of this configuration is significantly higher than the "beamformer first" system. Moreover, the computation complexity to implement the "AEC first" increases significantly as the number of microphones used to create the beam increases. Therefore, for a given computational complexity, the maximum number of microphones that can be used for beamforming are lower for the "AEC first" than the "beamformer first" setup. Using a comparatively larger number of microphones can increase the audio quality of the participants, especially when a participant moves farther away from the microphones.

In FIGS. 7 through 9B, thicker lines represent multichannel signals with the number of lines illustrated, whereas thinner lines represent a single channel signal.

Figure 7:
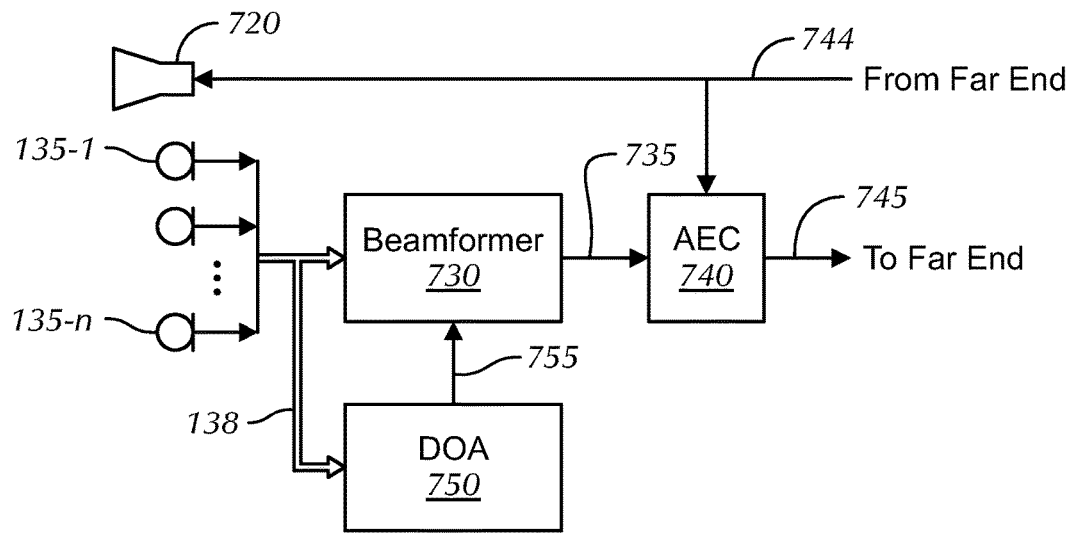
FIG. 7 illustrates the "beamforming first" strategy for processing signals.

FIG. 7 illustrates the "beamforming first" strategy for processing signals. The BMA 135 generates a set of N microphone signals 138, where the BMA further comprises a plurality of microphones 135-1 to 135-N. This "beamformer first" configuration uses the N set of microphone signals 138 to select a beam based on the Direction of Arrival (DOA) determination process/module 750. The far end signal 744 is converted to acoustic signals by speaker 720 which are then picked up by BMA 135. The DOA module 750 directs a beamforming process with beamformer 730 using DOA signal 755 to select the pre-calculated beam that properly combines the microphone signals 138 into a combined signal 735 that points in the direction indicated by the DOA module 750. An acoustic echo canceller (AEC) 740 then performs acoustic echo cancellation on the combined signal 735 using the far end signal 744 to create a combined echo cancelled signal 745 which is sent to the far end.

Figure 8:
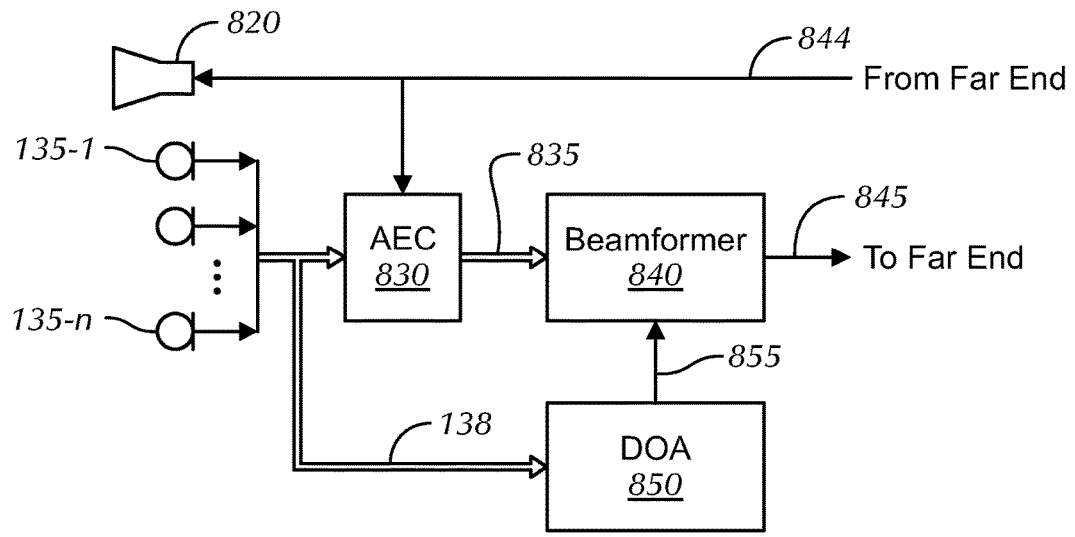
FIG. 8 illustrates the "echo cancelling first" strategy for processing signals.

FIG. 8 illustrates the "echo cancelling first" strategy for processing signals. The BMA 135, from a plurality of microphones 135-1 to 135-N, generates a set of N microphone signals 138. In this "AEC first" configuration, an acoustic echo cancellation process using an acoustic echo canceller (AEC) 830 performs acoustic echo cancellation on each microphone signal 138 separately using the far end signal 844 as a reference input in conjunction with the acoustic signals from speaker 820. Next, a set of N echo cancelled signals 835 are presented to a beamforming process 840. A Direction of Arrival (DOA) determination process/module 850 directs a beamforming process with beamformer 840, by way of the direction of arrival determination and using the DOA signal 855, to properly select the pre-calculated beam or beams that combines the echo cancelled signals 835 into a combined echo cancelled signal 845. Since echo is cancelled beforehand in the "AEC first" method, the echo canceller performance is not affected by beam switches. The "AEC first" configuration first cancels the echo from the audio of each microphone in the BMA and the beam is created from N echo cancelled signals, and then one or more beams are selected for transmission to the far end based on the DOA module 850 based on the direction of arrival determination. In terms of spatially filtering the audio, both configurations are substantially equivalent.

In order to balance computational complexity of the complete system and number of microphones to do beamforming, we created a conferencing solution with a beamformer and an echo canceller in a hybrid configuration with a "beamformer first" configuration to generate a number of fixed beams followed by echo cancellers for each fixed beam. In other words, we created M fixed beams from N microphones and subsequently applied echo cancellation on each beam. In conferencing applications with beamforming, we found that increasing the number of beams does not add as much benefit as increasing the number of microphones i.e. M<<N. Stated differently, this hybrid configuration allows for an increase in the number of microphones for better beamforming without the need for additional echo cancellers as the number of microphones is increased. Therefore, while we use a large number of microphones to create good beam patterns, the increase in computational complexity due to additional echo cancellers is significantly smaller than the "AEC first" configuration. In addition, the echo cancellers do not need to continually adapt as a result of large changes in the beamformer because the number of beams and beam pickup patterns may be held constant. Furthermore, since the beam is selected after the echo cancellation, the echo cancellation performance is not affected due to a change in the beam's location. The number of echo cancellers does not change by changing the number of microphones in the method of this invention. Furthermore, since the beamforming is done before the echo cancellation, the echo canceller also performs better than the "AEC first" setup. Therefore, embodiments of the present disclosure provide good echo cancellation performance and the increase in the computational complexity for a large number of microphones is smaller than the "AEC first" method.

One embodiment of the disclosed invention additionally employs post-processing individually for each beam to selectively reduce distortions from each beam. In a typical conference situation, different spatial directions, which may correspond to different beams, may have different characteristics, such as a noise source may be present in the look-direction of one beam and not the other. Therefore, post-processing in that direction may require different treatment that is possible in the disclosed implementations and not seen in other solutions.

Figure 9A:
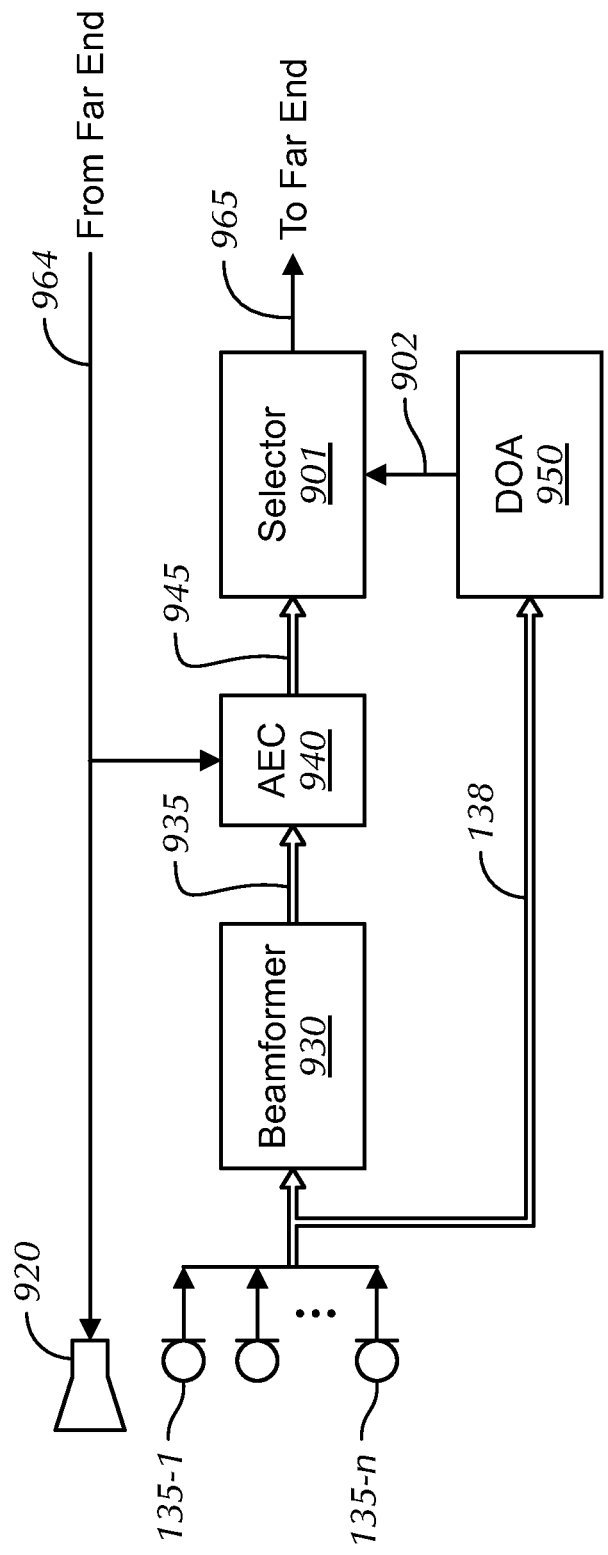
FIG. 9A is a simplified illustration of one embodiment of the present invention showing a hybrid processing strategy for processing signals.

FIG. 9A is a simplified illustration of one embodiment of the present invention showing a hybrid processing strategy for processing signals, and illustrates processing involved in sensing acoustic waves wherein signals from the microphones are combined, and then acoustic echo cancellation is performed on the combined signals. In order to balance computational complexity of the complete system and the number of microphones to do beamforming, this embodiment creates M combined echo cancelled signals 945 to present as the final output signal 965. The BMA 135, using a plurality of microphones 135-1 through 135-N, generates a set of N microphone signals 138. In this hybrid configuration, a beamforming module (beamformer) 930 performs a beamforming process that forms M fixed beams 935 from N microphone signals 138. An Acoustic Echo Canceller (AEC) process/module 940 performs acoustic echo cancellation on each of the M fixed beams 935 separately using the far end signal 964 as a reference input. As a result, M combined echo cancelled signals 945 are generated. A signal selection module (selector) 901, such as a multiplexer or other signal selection module, controlled by the Direction of Arrival determination (DOA) process/module 950 performs a direction of arrival determination, and using the DOA signal 902, selects one more of the M combined echo cancelled signals 945 as a final output signal 965, which is sent to the far end.

Figure 9B:
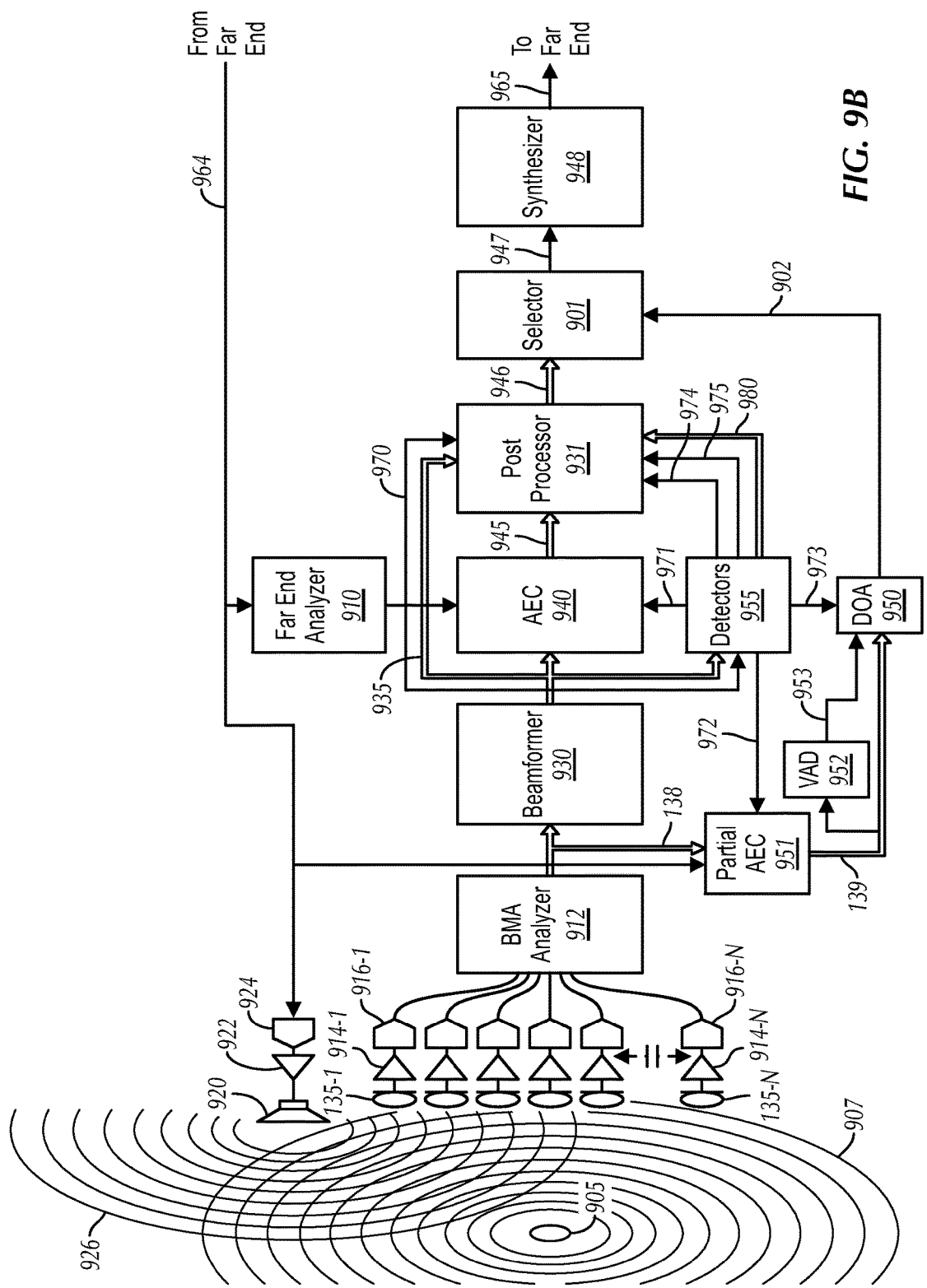
FIG. 9B is an expanded illustration of FIG. 9A that shows one embodiment of the present invention in more detail.

FIG. 9B is an expanded illustration of FIG. 9A that shows more detailed embodiments of the present invention. The BMA 135, using a plurality of microphones 135-1 through 135-N, generates a set of N microphone signals 138. The microphones are sensing acoustic waves 907 that are generated by the acoustic source 905, which is typically a talker in a conference environment. In addition, BMA 135 is sensing acoustic waves 926 that are generated by speaker 920 which is receiving the far end audio signal 964 from the far end of the conference. Before the far end signal 964 gets to speaker 920, it goes through digital to analog converter 924 and amplifier 922. As the acoustic waves 907 and 926 are sensed by the microphones 135-1 through 135-N, the corresponding microphone signals go through preamplifiers 914-1 through 914-N and then through analog to digital converters 916-1 through 916-N. The set of N microphone signals 138 may be subject to an additional analysis through the analysis module (BMA Analyzer) 912 before going through the beamforming process. A beamforming module (Beamformer) 930 takes the set of N microphone signals 138 and performs a beamforming process that forms M fixed beams 935. An Acoustic Echo Canceller (AEC) module 940 performs acoustic echo cancellation on each of the M fixed beams 935 separately using the far end reference signal 970 as a reference input in conjunction with the acoustic waves from speaker 920 that are received through BMA 135. Reference signal 970 must be processed through analysis module (far end analyzer) 910 if analysis module 912 is included in the embodiment. In addition, the AEC module 940 receives an RX ONLY signal 971 from the Detectors Module (Detectors) 955. The far end signal 964 may be subject to an additional analysis through the analysis module (far end analyzer) 910 before proceeding as far end reference signal 970 to other modules such as the AEC module 940. The AEC module 940 produces M combined echo cancelled signals 945. Another embodiment of the disclosed invention includes Post Processing module (Post Processor) 931 that performs post processing on the M combined echo cancelled signals 945, in conjunction with the fixed beams 935, and the far end reference signal 970. In addition, the Post Processing module 931 receives information from the Detectors module 955 by way of the RX ONLY signal 974, the SILENCE signal 975, and M Detectors signal 980. The Post Processing module 931 is discussed in more detail in another part of the present disclosure. The Post Processing module 931 produces the post processed M combined echo cancelled signals 946. A Signal Selection Module (Selector) 901, such as a multiplexer or other signal selection module, controlled by the Direction of Arrival (DOA) process/module 950 and the direction of arrival determination, using the DOA module 950 and DOA signal 902, selects one or more of the post processed M combined echo cancelled signals 946 as an output signal 947. A synthesis module (Synthesizer) 948 may provide additional signal processing to the output signal before being transmitted to the far end as far end signal 965. Synthesis module 948 is usually present if analysis modules 910 and 912 are included.

Another embodiment of the disclosed invention includes a partial acoustic echo canceller (Partial AEC) 951 that receives the set of N microphone signals 138 and performs a partial acoustic echo cancellation on a subset of the microphone signals which is greater than one and less than N microphone signals. The partial acoustic echo canceller 951 uses the partial acoustic echo cancellation operation in conjunction with the RX ONLY signal 972 from the Detectors 955 to improve the DOA estimate for the local end talk(s). And, the partial acoustic echo canceller 951 passes through up to N echo cancelled signals 139.

Another embodiment of the disclosed invention includes a Voice Activity Detector (VAD) 952 that enhances the direction of arrival determination. The voice activity detector process is discussed in more detail below. The Voice Activity Detector 952 uses information from up to N microphone signals 139 to see if there is voice activity on the microphone signals being received by the BMA 135. In practice, the VAD Detector 952 often uses 1 or 2 microphone signals to determine the VAD signal 953 for lower computation complexity. The Voice Activity Detector 952 sends the voice activity detector signal 953 to the DOA module 950.

The Direction of Arrival (DOA) determination process/module 950 receives the set of N microphone signals 139 and the voice activity detector signal 952 in conjunction with the RX ONLY signal 973 from the Detectors 955 to perform the direction of arrival determination that sends the DOA signal 902 to the Signal Selection Module 901. One embodiment of the disclosed invention provides that the DOA Module 950 and the Signal Selection Module 901 use the far end signal 964 as information to inhibit the Signal Selection Module 901 from changing the selection of the combined echo cancelled signals while only the far end signal is active. The DOA Module receives the far end signal information by way of the Detectors Module 955. The direction of arrival determination is discussed in more detail below.

Another embodiment of the disclosed invention includes a Detectors Module 955 that helps control the conferencing system for better output sound quality. The Detectors Module 955 provides the DOA Module 950 with RX ONLY signal 973; the partial acoustic echo canceller 951 with RX ONLY signal 972; the AEC with RX ONLY signal 971; and the Post Processing Module 931 with RX ONLY signal 974, the SILENCE signal 975, and M Detectors signal 980.

Figure 10:
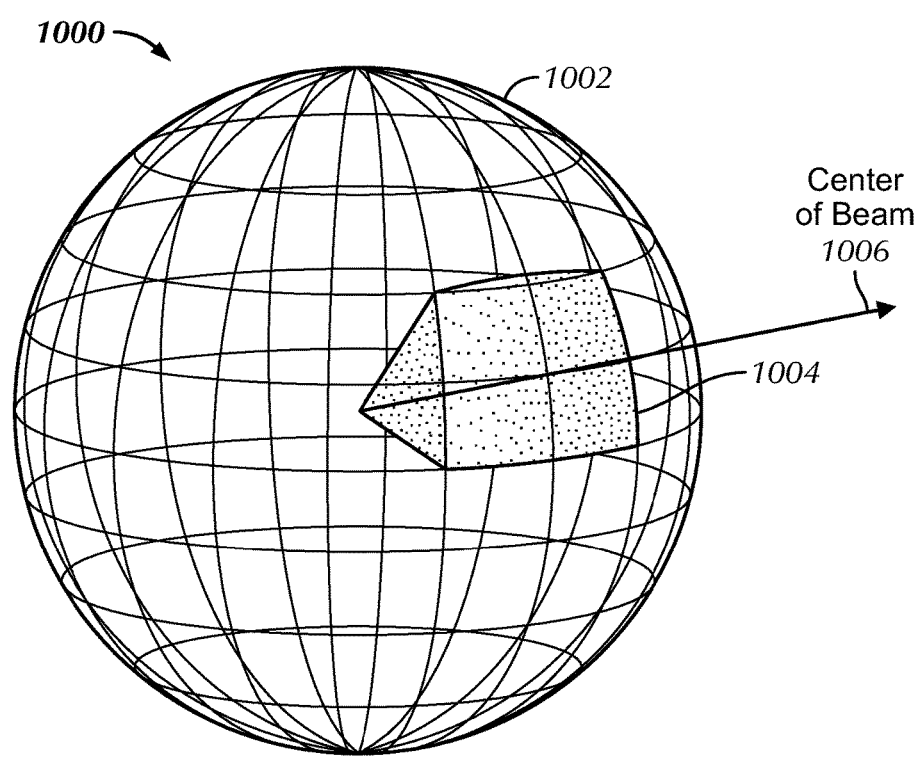
FIG. 10 illustrates the subdividing of the 3-dimensional space for creating a desired beam to pick up sound from a certain direction.

FIG. 10 illustrates 1000 the subdividing of the 3-dimensional space 1002 for creating a desired beam 1004 to pick up sound from a certain direction 1006. The fixed beams are created from the time, frequency, or subband domain signals of the "N" microphone signals. Specifically, pre-calculated beamforming weights for each beam are multiplied or convolved with the input microphone time, frequency, or subband domain signals. Subsequently, the outputs of each of these multiplications/convolutions are added to provide time, frequency, or subband signals for that beam. There are multiple ways to obtain the pre-calculated beamforming weights for creating fixed beams to filter out desired spatial directions—more commonly known as beamforming in the literature. Some of the known techniques for beamforming are delay-and-sum beamformer, filter-and-sum beamformer (also called superdirectional beamformers), and several other optimization-based beamformers (such as minimax, weighted least-squares etc.). There also exists a different class of beamforming algorithms known as differential beamforming; however, they are more suited for close talking microphones such as podium microphones and not for conference microphones. The various beamforming designs differ in the beam shape and in the ability of reducing uncorrelated and correlated noise. A detailed discussion of these properties is not included in the present disclosure; however, it must be mentioned that pre-calculated beamforming weights calculated with an optimization method (that will be described later) was found most suitable for our application. Apart from various algorithms used to design weights, pre-calculated beamforming weights can be designed:

a) to do beamforming in the time-domain, frequency-domain, or subband-domain.
b) for real-valued signals or complex-valued signals.
c) for a narrowband or wideband implementation.

When implemented correctly, the above differences do not affect the output sound quality; however, they may differ in the overall system delay and the computational complexity. The choice of the design method for creating pre-calculated beamforming weights can be made based on the system requirements. In the implementation of the present disclosure, we designed the beamforming weights for the subband-domain complex-valued signals assuming narrowband implementation. The weights are pre-calculated using a weighted least-squares method with multiple constraints, for each subband, microphone and beam, and are stored in memory. To facilitate the presentation, we need to mathematically represent a direction in space and define some other notations. Let a steering vector for the direction in space (θ, φ) with respect to the $i^{th}$ microphone in the beamformer and for the $j^{th}$ subband be:

$$A(j, \theta, \phi) = \begin{bmatrix} e^{-j2\pi j\tau(0,\theta,\phi)/N_s} \\ e^{-j2\pi j\tau(1,\theta,\phi)/N_s} \\ \vdots \\ e^{-j2\pi j\tau(N-1,\theta,\phi)/N_s} \end{bmatrix} \quad (1)$$

where $$\tau(i, \theta, \phi) = r_i \cos(\theta - \theta_i) \cos(\phi - \phi_i)/c$$

and $(r_i, \theta_i, \phi_i)$ are the polar coordinates of the $i^{th}$ microphone, N is the number of microphones, $N_s$ is the number of subbands and c is the speed of sound in air.

The steering vector $A(j, \theta, \phi)$ can be used to approximately represent sound coming from direction $(\theta, \phi)$ in space under far field assumption and if the subbands are properly designed. The time-domain overlap in the subband-design process should be at least as long the maximum time-delay between two microphones in the microphone array. The far field assumption is valid for our application. We designed the subbands so that the steering vector can be used to represent the signal coming from any direction in space on various microphones. Furthermore, let the microphone subband signal for the $i^{th}$ microphone, i=0 ... N−1, and $j^{th}$ subband, j=0 ... $N_s$−1, at time n be $x_i(n,j)$ and the beamforming weight for the $i^{th}$ microphone, $j^{th}$ subband and $k^{th}$ beam, k=0 ... M−1, be $w_i^k(j)$, then the signal vector of the microphone signals for the $j^{th}$ subband is denoted as $x(n,j)=[x_0(n,j) \, x_1(n,j) \ldots x_{N-1}(n,j)]^H$, the signal vector of the subband signals for the $i^{th}$ microphone is denoted as $x_i(n)=[x_i(n,0) \, x_i(n,1) \ldots x_i(n, N_s-1)]^H$ and the vector of the beamforming weights for the $j^{th}$ subband and $k^{th}$ beam is denoted as $w^k(j)=[w_0^k(j) \, w_1^k(j) \, w_{N-1}^k(j)]^H$, where H denotes the Hermitian operation. With the above notation, the beamforming weight vector $w^k(j)$ for the $j^{th}$ subband and the $k^{th}$ beam is obtained using a weighted least-squares method that optimizes weighted mean-squares-error at $N_\theta$ azimuth angles and $N_\phi$ elevation angles. The spatial directional grid points are shown in FIG. 10. The desired beam shape $B(\theta, \phi)$ is specified by assigning a value close to 1 (no attenuation) for look-direction and small values to other directions where high attenuation is required. The look-direction the beam is shown with solid fill in FIG. 10.

Figure 11:
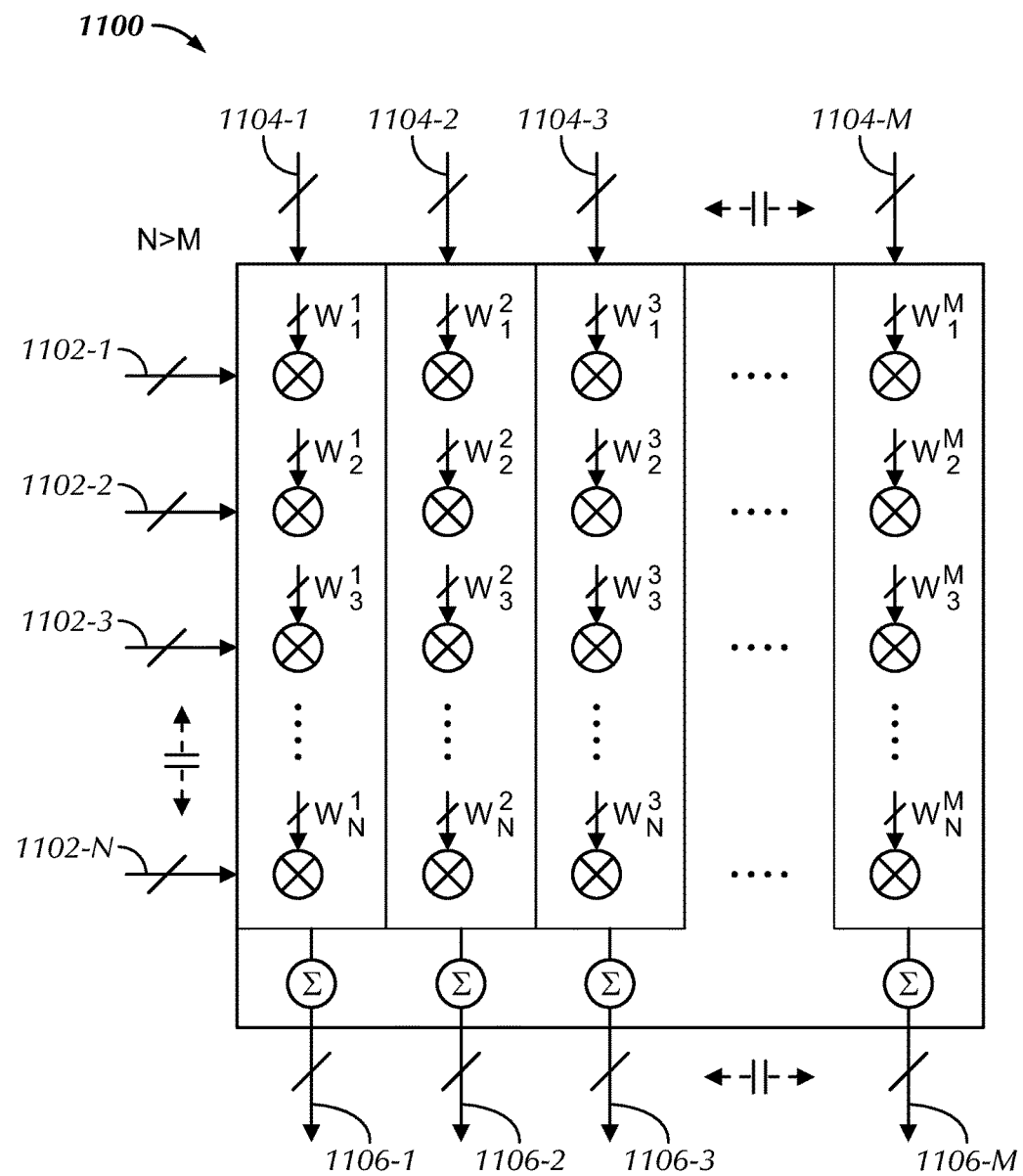
FIG. 11 is a block diagram describing the creation of fixed beams from the microphone input signals and pre-calculated beamforming weights.

FIG. 11 is a block diagram 1100 describing the creation of fixed beams from the microphone input signals and pre-calculated beamforming weights. The fixed beams are shown as beams 1106-1 through 1106-M. The microphone input signals are shown as 1102-1 through 1102-N. And the pre-calculated beamforming weights for the specified groups are shown as 1104-1 through 1104-M.

With the previous description, the problem of finding the beamformer weights for the $j^{th}$ subband and $k^{th}$ beam can be written as:

$$w^k(j) = \min_{w^k(j)} \sum_{l_\phi=1}^{N_\phi} \sum_{l_\theta=1}^{N_\theta} F_l \left| A^H\left(j, \frac{2\pi l_\theta}{N_\theta}, \frac{2\pi l_\phi}{N_\phi}\right) w^k(j) - B\left(\frac{2\pi l_\theta}{N_\theta}, \frac{2\pi l_\phi}{N_\phi}\right) \right|^2 \quad (2)$$

subject to $A(j, \theta_0, \phi_0) w^k(j) = 1$

-continued $$\|(w^k(j))^H R_n w^k(j)\| < \delta_w$$

$$A(j, \theta_m, \phi_m) w^k(j) < \delta_s, m = 0 \ldots N_m - 1$$

where $F_l$ are the weights to emphasize the passband (directions in space with no attenuation) and stopband (directions in space with attenuation) behavior, $(\theta_0, \phi_0)$ is the center of the desired beam, $R_n$ is the N×N covariance matrix for the spatial noise at these microphones, and the set of values $(\theta_m, \phi_m)$ represent spatial directions where a beam has higher side lobes or unwanted audio sources (jammers) are present. The constants $\delta_w$ and $\delta_s$ are small positive numbers.

The above optimization problem is solved to generate the pre-calculated beamforming weights, which are stored in memory and are used according to FIG. 11 to create "M" beams from "N" microphone signals.

Figure 12:
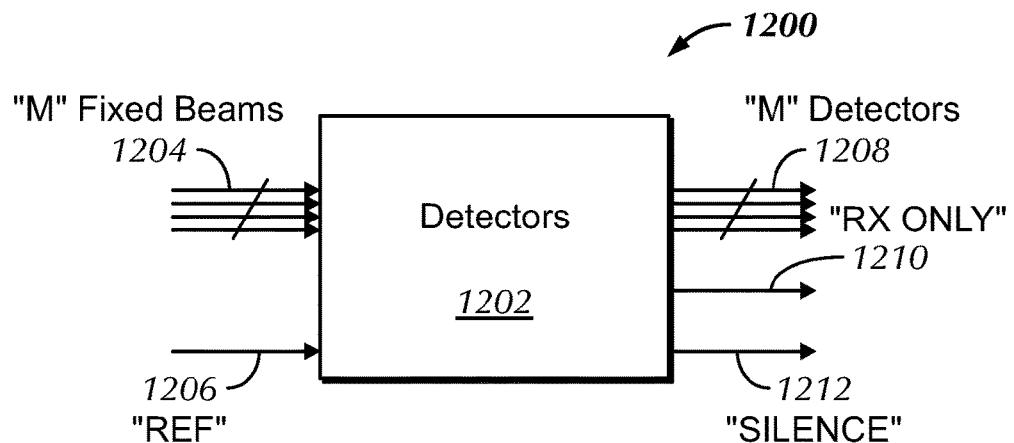
FIG. 12 is an input-output block diagram of detectors.

FIG. 12 is an input-output block diagram 1200 of the Detectors Module 1202. The Detectors Module 1202 controls the conferencing system for better output sound quality. The Detectors Module 1202 uses "M" fixed beams 1204 after fixed beamforming and the reference signal 1206 to indicate various states of the system. These states are "RX ONLY", "TX ONLY", "DOUBLE TALK", "UNKNOWN" and "SILENCE". "RX ONLY" 1210 and "SILENCE" 1212 are the same for all the beams; whereas "DOUBLE TALK", "TX ONLY" and "UNKNOWN" are represented by "M" detectors 1208, one for each beam. The Detectors Module 1202 uses peak meters and RMS meters on the fixed beam and reference signals and compare them with various thresholds to indicate various states of the system. The "RX ONLY" 1210 state indicates the presence of audio at beams/microphones due to the far-end audio and not due to the local audio. The acoustic echo canceller (AEC) is adapted during the "RX ONLY" state. In the "RX ONLY" state the acoustic echo cancellers for the "M" beams are updated as shown in FIG. 12. The "TX ONLY" state for a beam indicates presence of the local audio and not the far end audio. "DOUBLE TALK" indicates presence of both the far end audio and the local audio. "SILENCE" 1212 indicates no activity in the room. This state is used for the background noise calculation. "UNKNOWN" indicates when detectors cannot distinguish between one state from another. These detector signals are used by the AEC Module, the DOA Module, and the Post Processing Module.

Figure 13:
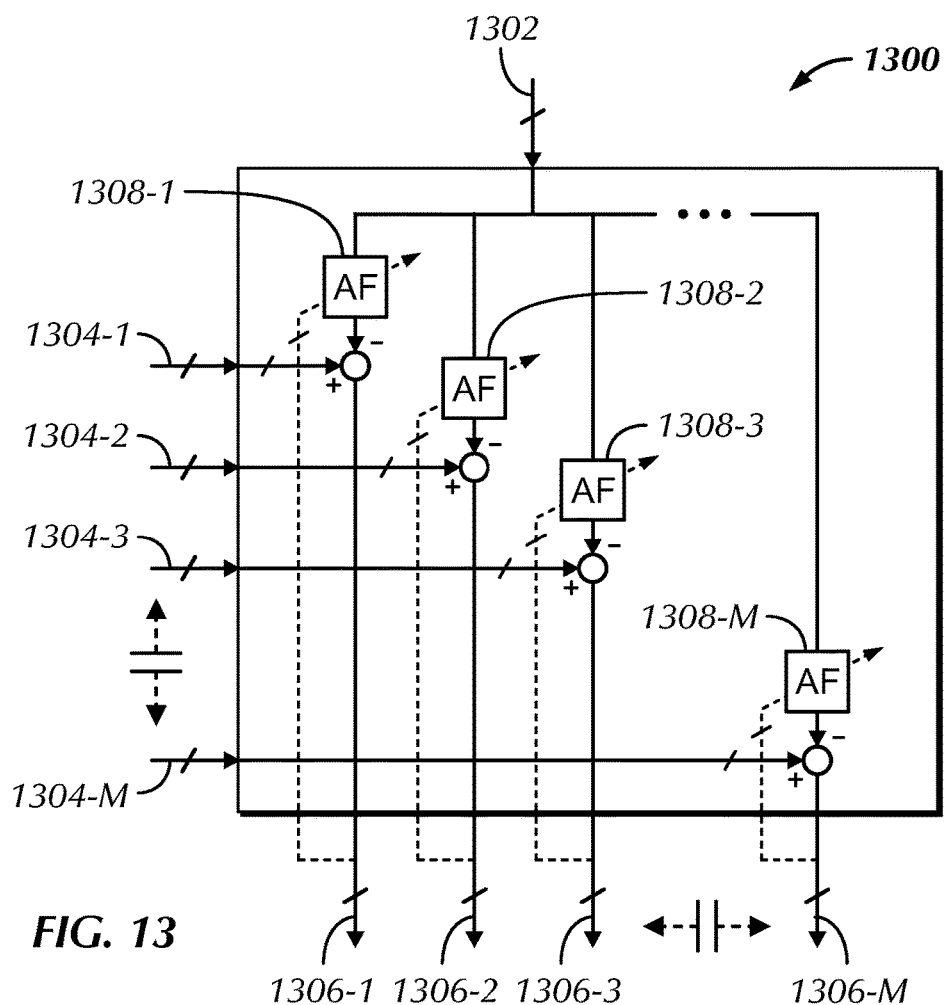
FIG. 13 is a block diagram showing echo cancellation of "M" beams with respect to the reference signal.

FIG. 13 is a block diagram 1300 showing echo cancellation of "M" beams with respect to the reference signal. The input beams 1304-1 through 1304-M have Adaptive Filters (AF) 1308-1 through 1308-M applied to produce the echo cancelled beams 1306-1 through 1306-M with respect to reference signal 1302 from the far end. The direction of arrival determination does not use all the microphones for determining a talker's direction in a room, which is done to save computational complexity. The DOA determination suggests which beam or beams (after echo cancellation and post-processing as shown in FIG. 9B) to select to transmit to the far-end. The selection of a beam is also sometimes referred to as pointing to a beam. It also uses echo cancelled microphone signals as shown in FIG. 9B to avoid pointing to the far-end audio because beams are designed to pick up the local audio in the room. If a beam points to the far end audio (towards the loudspeaker direction in the room) while the local talker is talking, the local talker's audio will be attenuated, which is not desirable. The direction of arrival determination finds the talker's direction using the steered response power—phase transform (SRP-PHAT) method, which is a well-known method employed in the design of beamforming microphone arrays. The algorithm is an extension of the generalized cross correlation (GCC) algorithm pioneered by Knapp and Carter in 1976, that was later extended by Rabinkin in 1996, and reached its current form in the works of Johansson in 2002 and later in 2005. The SRP-PHAT algorithm produces a source position estimate based on the time delay difference of arrival of a wave front across two or more microphone elements. The algorithm operates by extracting the phase difference between the microphone signals from an estimate of their cross spectral density (CSD) function of the $N_d<N$ microphone signals used to find the talker's direction. As an example, the cross spectral density between microphones can be calculated with a running average using a single pole IIR filter with a decay constant $\lambda_d$ as:

$$X_{lm}(n,k)=\lambda_d X_{lm}(n-1,k)+(1-\lambda_d)x_l(n,k)x_m^*(n,k) \quad (3)$$

Once the cross spectral densities are known, the talker's direction can be found by maximizing the SRP-PHAT index in the desired look region (DLR) directions. The SRP-PHAT index is given by:

$$(\theta_d, \phi_d)(n) = \arg \max_{\substack{(\theta,\phi) \\ (\theta,\phi)\in DLR}} \sum_{l=1}^{N_d}\sum_{m=1}^{N_d}\sum_{k=0}^{N_s^d} \frac{X_{lm}(n,k)}{|X_{lm}(n,k)|} e^{-j2\pi k(\tau(l,\theta,\phi)-\tau(m,\theta,\phi))/N_s} \quad (4)$$

where $N_s^d<N_d$ is the number of subbands used in the direction-of-arrival calculation.

We run additional constraints to further improve talker's direction accuracy in the conferencing solution. First, the cross-spectral density is updated if voice-activity is detected in one of the microphone signals and this voice-activity is not due to the far end audio. The voice-activity is detected using a voice-activity-detector (VAD) as shown in FIG. 9B. The "RX ONLY" state is used to indicate activity of the far end audio. To further improve the direction-of-arrival accuracy, the SRP-PHAT is calculated and the DOA determination is updated only if the local activity is present at least a few frames of audio at a stretch; otherwise the old value of the DOA determination is used for processing. This is detected by a counter that keeps track of local audio activity. The controls are described in the flow chart 1400 below in FIG. 14.

Figure 14:
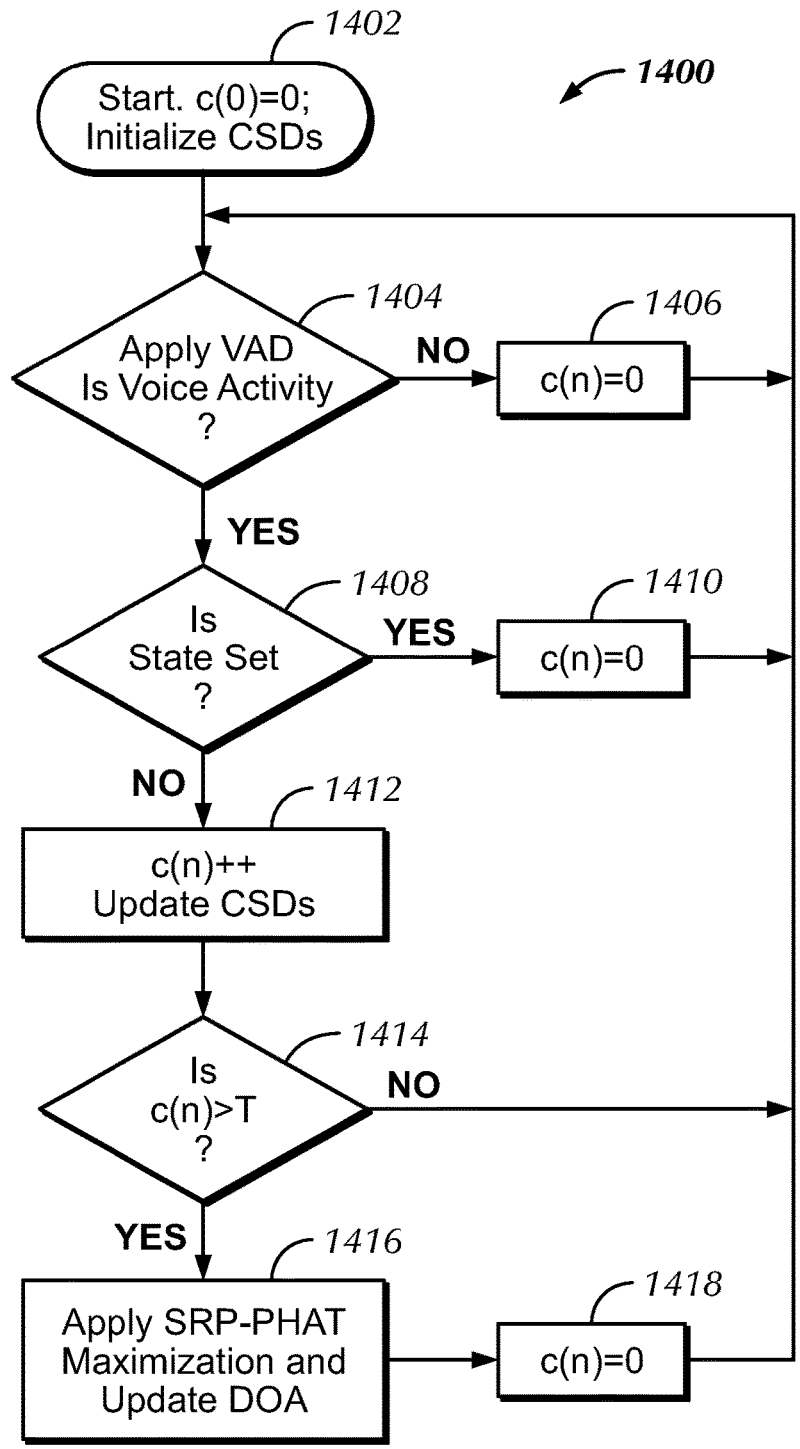
FIG. 14 illustrates using a voice activity detector to enhance the direction of arrival determination.

FIG. 14 illustrates a voice activity detector process 1400 using a voice activity detector to enhance the direction of arrival determination. The voice activity detector process starts at 1402 by initializing the cross spectral density (CSD) and initializing the counter. The next step 1404 has the voice activity detector check to see if there is voice activity. If there is no voice activity, the counter is reset to zero 1406, and the process starts over. If there is voice activity, the next step 1408 checks to see if the state is set. One embodiment of the disclosed invention uses the "RX ONLY" state. Another embodiment may use the "DOUBLE TALK" state. Additional states and/or combinations of states are also possible. If yes, the counter is reset to zero 1410 and the process starts over. If not, then the counter is updated and the CSD's are updated 1412. The next step 1414 is to see if the counter is current (i.e., the local activity is present at least for a couple of frames of audio), if not, then process starts over. If yes, then the SRP-PHAT is calculated and the DOA determination is updated 1416 and the counter is set to zero 1418 and the process starts over.

Figure 15:
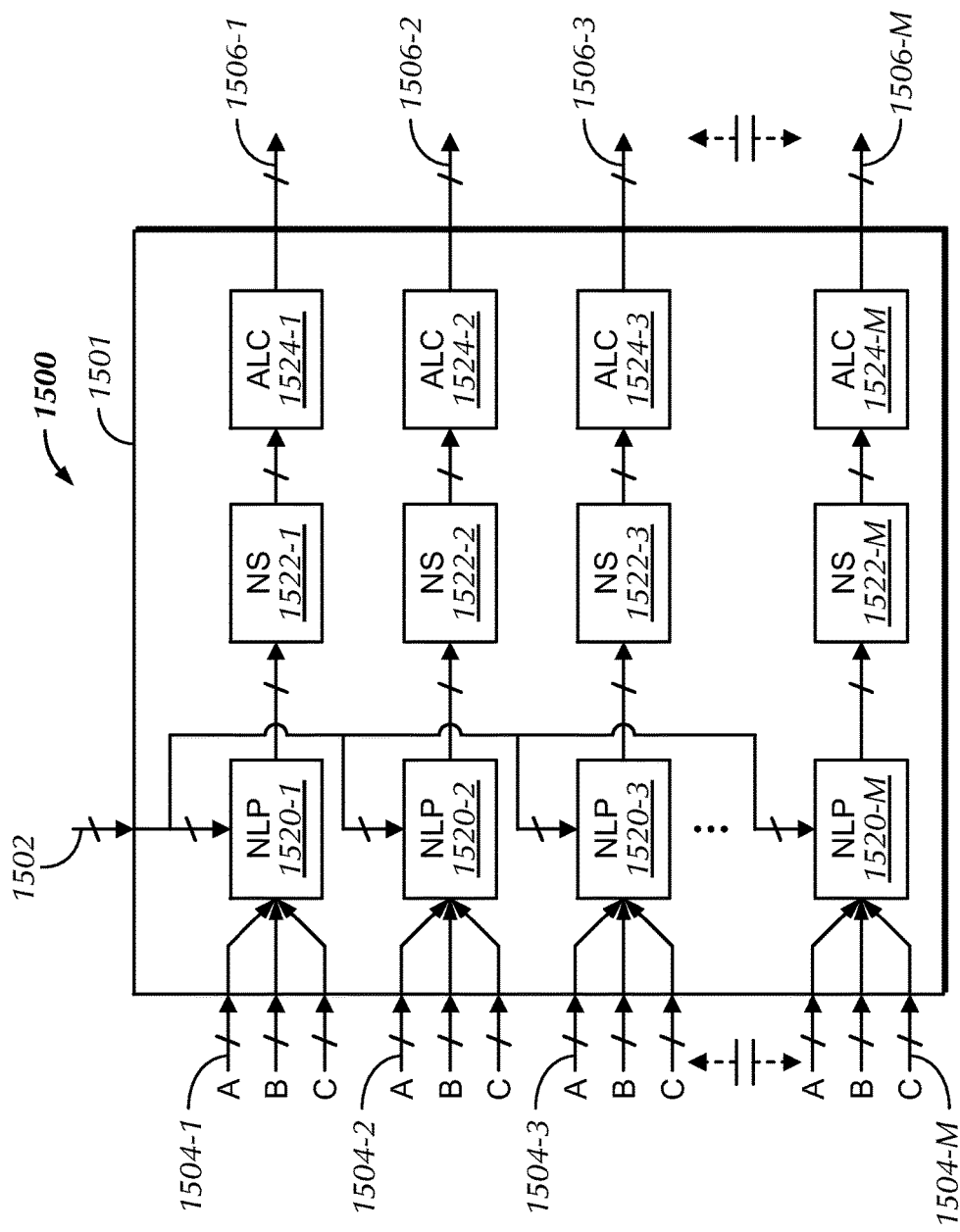
FIG. 15 is a block diagram showing various components of the post processing used to improve the sound quality of audio sent to the far end.

FIG. 15 is a block diagram 1500 showing various components of the post processing module 1501 used to improve the sound quality of the audio sent to the far end. After the echo cancellation from each fixed beam, post processing is applied on each fixed beam independently so as to further reduce residual echo, acoustic noise, and automatically control the output level so as to improve the output sound quality for the far end listener. The post processing 1501 module receives the combined input signals 1504-1 through 1504-M. Each input signal includes 1504-1A as M Fixed Beams from the beamformer (which is also the non-echo cancelled signals), 1504-1B as M combined echo cancelled signals from the AEC, and 1504-1C as M Detector information signals from the Detector. The other input signals 1504-2 through 1504-M are similarly constructed. Starting with the combined echo cancelled beams input signal 1504-1, one operation performed is the non-linear-processing (NLP) 1520-1 process that suppresses the residual echo in the output by looking at the reference signal 1502, echo cancelled signal 1504-1B, non-echo cancelled signal 1504-1A, and detectors information 1504-1C. Another operation performed on the signal is Noise Suppression (NS) 1522-1 to produce a noise suppressed signal. And then, another operation performed on the echo suppressed signal is Automatic Level Control (ALC) 1524-1. The goal for controlling the volume level is to make soft or loud talkers sound at the same volume level. The post processed signal 1506-1 is then sent on to transmission to the far end. The other input signals 1504-2 through 1504-M are similarly processed to produce the other post processed signals 1506-2 through 1506-M. The previously mentioned types of signal processing are techniques that are known in the art and are not covered in further detail in the present disclosure.

Figure 16:
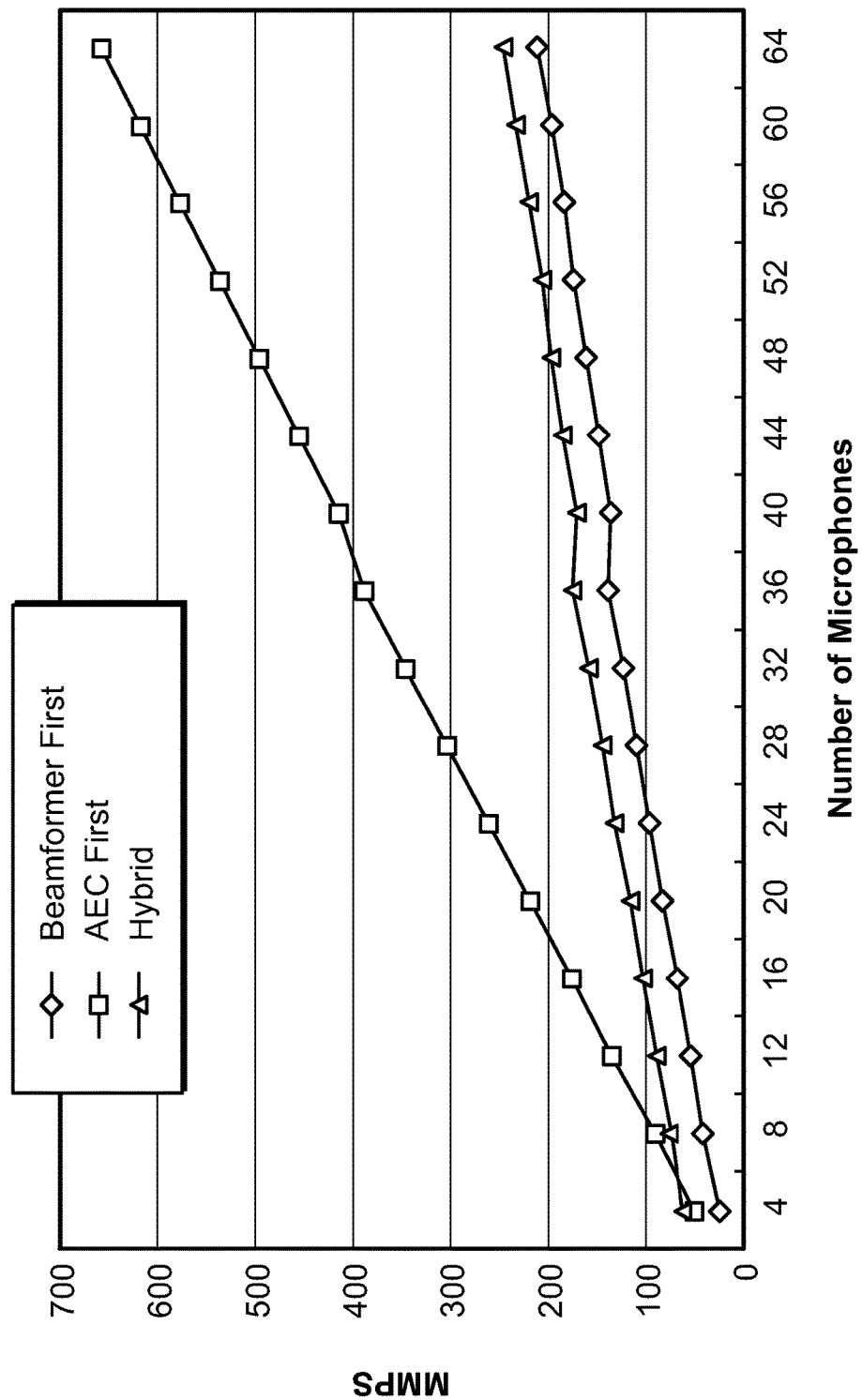
FIG. 16 illustrates the computational complexity of various embodiments relative to number of microphones in a beamforming microphone array.

FIG. 16 illustrates the computational complexity of various embodiments relative to the number of microphones in a beamforming microphone array. The computational complexity for various configurations and number of microphones was calculated in terms of required million-multiplications per second (MMPS). It can be seen that the computational complexity for all methods increases as the number of microphones increases. However, the increase in the computational complexity for the "beamformer first" configuration and the hybrid configuration is much smaller than that of the "AEC first" configuration. With low computational complexity, and the fact that the implementation of the hybrid configuration has less chance of errors in the echo cancellation as a talker's direction switches, the hybrid configuration represents a good balance between quality and computational complexity for audio conferencing systems.

While the present disclosure has been described herein with respect to certain illustrated and described embodiments, those of ordinary skill in the art will recognize and appreciate that the present invention is not so limited. Rather, many additions, deletions, and modifications to the illustrated and described embodiments may be made without departing from the scope of the invention as hereinafter claimed along with their legal equivalents. In addition, features from one embodiment may be combined with features of another embodiment while still being encompassed within the scope of the invention as contemplated by the inventor. The disclosure of the present invention is exemplary only, with the true scope of the present invention being determined by the included claims.

We claim the following:

1. A conferencing apparatus for a conference between a local end and a far end that combines a beamforming microphone array with an acoustic echo canceller, comprising:
   a beamforming microphone array that further comprises a plurality of microphones wherein each microphone is configured to sense acoustic waves and said plurality of microphones are oriented to develop a corresponding plurality of microphone signals;
   a processor, memory, and storage operably coupled to said beamforming microphone array, said processor configured to:
      perform a beamforming operation with a beamformer to combine the plurality of microphone signals from said beamforming microphone array into a plurality of combined signals that is greater in number than one and less in number than the plurality of microphone signals, each of the plurality of combined signals corresponding to a different configurable fixed beam with pre-computed parameters;
      perform an acoustic echo cancellation operation with an acoustic echo canceller on the plurality of combined signals to generate a plurality of combined echo cancelled signals;
      perform a direction of arrival determination on a plurality of microphone signals; and
      select, in response to the direction of arrival determination, with a selector, one or more of the combined echo cancelled signals for transmission to the far end.

2. The apparatus of claim 1 wherein said processor is further configured to perform a partial acoustic echo cancellation operation with a partial acoustic echo canceller on a subset of microphone signals which is greater than one and less than the plurality of microphone signals wherein the partial acoustic echo cancellation operation is used to improve said direction of arrival determination by estimating the direction of the talker.

3. The apparatus of claim 1 wherein said processor is further configured to noise filter the plurality of combined echo cancelled signals.

4. The apparatus of claim 1 wherein said acoustic echo cancellation operation is performed on each said fixed beam with a separate said acoustic echo canceller.

5. The apparatus of claim 1 wherein said processor is further configured to enhance the direction of arrival determination with a voice activity detector.

6. The apparatus of claim 1 wherein said selector transmits a plurality of said combined echo cancelled signals to the far end.

7. A method to manufacture a conferencing apparatus for a conference between a local end and a far end that combines a beamforming microphone array with an acoustic echo canceller, comprising:
   providing a beamforming microphone array that further comprises a plurality of microphones wherein each microphone is configured to sense acoustic waves and said plurality of microphones are oriented to develop a corresponding plurality of microphone signals;
   operably coupling a processor, memory, and storage to said beamforming microphone array, said processor configured to:
      perform a beamforming operation with a beamformer to combine the plurality of microphone signals from said beamforming microphone array into a plurality of combined signals that is greater in number than one and less in number than the plurality of microphone signals, each of the plurality of combined signals corresponding to a different configurable fixed beam with pre-computed parameters;
      perform an acoustic echo cancellation operation with an acoustic echo canceller on the plurality of combined signals to generate a plurality of combined echo cancelled signals;
      perform a direction of arrival determination on a plurality of microphone signals; and
      select, in response to the direction of arrival determination, with a selector, one or more of the combined echo cancelled signals for transmission to the far end.

8. The method of claim 7 wherein said processor is further configured to perform a partial acoustic echo cancellation operation with a partial acoustic echo canceller on a subset of the microphone signals that is greater than one and less than the plurality of microphone signals wherein the partial acoustic echo cancellation operation is used to improve said direction of arrival determination by estimating the direction of the talker.

9. The method of claim 7 wherein said processor is further configured to noise filter the plurality of combined echo cancelled signals.

10. The method of claim 7 wherein said acoustic echo cancellation operation is performed on each said fixed beam with a separate said acoustic echo canceller.

11. The method of claim 7 wherein said processor is further configured to enhance the direction of arrival determination with a voice activity detector.

12. The method of claim 7 wherein said selector transmits a plurality of said combined echo cancelled signals to the far end.

13. A method performed by a conferencing apparatus for a conference between a local end and a far end that combines a beamforming microphone array with an acoustic echo canceller, comprising:
   sensing acoustic waves with a beamforming microphone array that further comprises a plurality of microphones wherein said plurality of microphones are oriented to develop a corresponding plurality of microphone signals;
   providing a processor, memory, and storage operably coupled to said beamforming microphone array, said processor configured to:
      perform a beamforming operation with a beamformer to combine the plurality of microphone signals from said beamforming microphone array into a plurality of combined signals that is greater in number than one and less in number than the plurality of microphone signals, each of the plurality of combined signals corresponding to a different configurable fixed beam with pre-computed parameters;
      perform an acoustic echo cancellation operation with an acoustic echo canceller on the plurality of combined signals to generate a plurality of combined echo cancelled signals;
      perform a direction of arrival determination on a plurality of microphone signals; and
      select, in response to the direction of arrival determination, with selector, one or more of the combined echo cancelled signals for transmission to the far end.

14. The method of claim 13 wherein said processor is further configured to perform a partial acoustic echo cancellation operation with a partial acoustic echo canceller on a subset of the microphone signals that is greater than one and less than the plurality of microphone signals wherein the partial acoustic echo cancellation operation is used to improve said direction of arrival determination by estimating the direction of the talker.

15. The method of claim 13 wherein said processor is further configured to noise filter the plurality of combined echo cancelled signals.

16. The method of claim 13 wherein said acoustic echo cancellation operation is performed on each said fixed beam with a separate said acoustic echo canceller.

17. The method of claim 13 wherein said processor is further configured to enhance the direction of arrival determination with a voice activity detector.

18. The method of claim 13 wherein said selector transmits a plurality of said combined echo cancelled signals to the far end.

19. A non-transitory program storage device that tangibly embodies a program of instructions executable by a computing device, and that is readable by said computing device, said computing device being in communication with or being a part of a conferencing apparatus to perform a method for a conference between a local end and a far end that combines a beamforming microphone array with an acoustic echo canceller, comprising:

sensing acoustic waves with a beamforming microphone array that further comprises a plurality of microphones wherein said plurality of microphones are oriented to develop a corresponding plurality of microphone signals;

providing a processor, memory, and storage operably coupled to said beamforming microphone array, said processor configured to:

perform a beamforming operation with a beamformer to combine the plurality of microphone signals from said beamforming microphone array to a plurality of combined signals that is greater in number than one and less in number than the plurality of microphone signals, each of the plurality of combined signals corresponding to a different configurable fixed beam with pre-computed parameters;

perform an acoustic echo cancellation operation with an acoustic echo canceller on the plurality of combined signals to generate a plurality of combined echo cancelled signals;

perform a direction of arrival determination on a plurality of microphone signals; and select, in response to the direction of arrival determination, with a selector, one of the combined echo cancelled signals for transmission to the far end.

20. The device of claim 19 wherein said processor is further configured to perform a partial acoustic echo cancellation operation with a partial acoustic echo canceller on a subset of the microphone signals that is greater than one and less than the plurality of microphone signals wherein the partial acoustic echo cancellation operation is used to improve said direction of arrival determination by estimating the direction of the talker.

21. The device of claim 19 wherein said processor is further configured to noise filter the plurality of combined echo cancelled signals.

22. The device of claim 19 wherein said acoustic echo cancellation operation is performed on each said fixed beam with a separate said acoustic echo canceller.

23. The device of claim 19 wherein said processor is further configured to enhance the direction of arrival determination with a voice activity detector.

24. The device of claim 19 wherein said selector transmits a plurality of said combined echo cancelled signals to the far end.

* * * * *

UNITED STATES PATENT AND TRADEMARK OFFICE
CERTIFICATE OF CORRECTION

PATENT NO. : 9,866,952 B2
APPLICATION NO. : 15/217904
DATED : January 9, 2018
INVENTOR(S) : Ashutosh Pandey et al.

Page 1 of 2

It is certified that error appears in the above-identified patent and that said Letters Patent is hereby corrected as shown below:

On the Title Page

On the page 2, in Column 2, under "Other Publications", Line 22, delete "Beamfor4ming" and insert -- Beamforming --, therefor.

On the page 2, in Column 2, under "Other Publications", Line 56, delete "Koyoto" and insert -- Kyoto --, therefor.

On the page 3, in Column 1, under "Other Publications", Line 4, delete "ISBN 978-1-244-1483-3," and insert -- ISBN 978-1-4244-1483-3, --, therefor.

On the page 3, in Column 1, under "Other Publications", Line 10, delete "Accoustical" and insert -- Acoustical --, therefor.

On the page 3, in Column 1, under "Other Publications", Line 13, delete "GSCin" and insert -- GSC in --, therefor.

On the page 3, in Column 1, under "Other Publications", Line 41, delete "Vorkshop" and insert -- Workshop --, therefor.

On the page 3, in Column 2, under "Other Publications", Line 7, delete "Norkshop" and insert -- Workshop --, therefor.

On the page 3, in Column 2, under "Other Publications", Line 50, Delete "Incorporatedv." and insert -- Incorporated v. --, therefor.

Signed and Sealed this
Fifth Day of June, 2018

Andrei Iancu
*Director of the United States Patent and Trademark Office*

CERTIFICATE OF CORRECTION (continued)
U.S. Pat. No. 9,866,952 B2

In the Specification

In Column 6, Line 10, delete "and or" and insert -- and/or --, therefor.

In Column 8, Line 53, delete "maximun" and insert -- maximum --, therefor.